US012320099B2

(12) United States Patent
Mori et al.

(10) Patent No.: US 12,320,099 B2
(45) Date of Patent: Jun. 3, 2025

(54) HYDRAULIC SYSTEM OF WORKING MACHINE AND METHOD FOR CONTROLLING HYDRAULIC SYSTEM OF WORKING MACHINE

(71) Applicant: KUBOTA CORPORATION, Osaka (JP)

(72) Inventors: Hiroya Mori, Osaka (JP); Hiroshi Horii, Osaka (JP)

(73) Assignee: KUBOTA CORPORATION, Osaka (JP)

( * ) Notice: Subject to any disclaimer, the term of this patent is extended or adjusted under 35 U.S.C. 154(b) by 0 days.

(21) Appl. No.: 18/738,284

(22) Filed: Jun. 10, 2024

(65) Prior Publication Data

US 2024/0328120 A1 Oct. 3, 2024

Related U.S. Application Data

(63) Continuation of application No. PCT/JP2022/045019, filed on Dec. 7, 2022.

(30) Foreign Application Priority Data

Dec. 28, 2021 (JP) ................................ 2021-214936

(51) Int. Cl.
*E02F 9/22* (2006.01)

(52) U.S. Cl.
CPC .......... *E02F 9/2228* (2013.01); *E02F 9/2285* (2013.01); *F15B 2211/755* (2013.01)

(58) Field of Classification Search
CPC .......... F15B 2211/755; F15B 2211/765; E02F 9/2228; E02F 9/2285; E02F 9/22
See application file for complete search history.

(56) References Cited

U.S. PATENT DOCUMENTS 4,358,989 A * 11/1982 Tordenmalm ......... E02F 9/2214 91/196
4,844,685 A * 7/1989 Sagaser ................... E02F 3/433 91/363 R (Continued)

FOREIGN PATENT DOCUMENTS

JP S62153091 A * 7/1987
JP 2010261521 A * 11/2010

OTHER PUBLICATIONS

International Search Report dated Jan. 10, 2023 issued in International WIPO application PCT/JP2022/045019 with English language translation thereof.

(Continued)

*Primary Examiner* — Thomas E Lazo
(74) *Attorney, Agent, or Firm* — GREENBLUM & BERNSTEIN, P.L.C.

(57) ABSTRACT

In a hydraulic system of a working device, a controller includes a first calculator that calculates a first electric current value for decelerating an angular velocity of a movable member, a second calculator that calculates a second electric current value for decreasing a supply flow rate of a hydraulic fluid to a hydraulic cylinder, and an electric current restrictor that corrects an electric current supplied to an electromagnetic proportional valve by the second electric current value if a determination distance of an operation length from a current operation position of the hydraulic cylinder to a stroke end is longer than a first threshold value and is not more than a second threshold value and corrects the electric current supplied to the electromagnetic proportional valve by either the selected first or second electric current value if the determination distance is not more than the first threshold value.

9 Claims, 14 Drawing Sheets

(56) References Cited

U.S. PATENT DOCUMENTS

| | | | | | |
|---|---|---|---|---|---|
| 5,224,664 | A * | 7/1993 | Adams, Sr. | G05B 5/01 | 318/566 |
| 5,320,025 | A * | 6/1994 | Ikari | E02F 9/2203 | 91/461 |
| 5,383,390 | A * | 1/1995 | Lukich | E02F 9/2221 | 60/426 |
| 5,511,458 | A * | 4/1996 | Kamata | E02F 9/2214 | 91/361 |
| 5,513,551 | A * | 5/1996 | Morishita | F15B 21/087 | 91/459 |
| 5,537,818 | A * | 7/1996 | Hosseini | E02F 9/2214 | 91/461 |
| 7,318,292 | B2 * | 1/2008 | Helbling | F15B 11/048 | 91/393 |
| 8,548,693 | B2 * | 10/2013 | Numazaki | E02F 9/2012 | 701/50 |
| 10,584,463 | B2 * | 3/2020 | Matsuyama | E02F 3/436 | |
| 2020/0362889 | A1 * | 11/2020 | Hodel | G06N 3/084 | |

OTHER PUBLICATIONS

Written Opinion dated Jan. 10, 2023 issued in International WIPO application PCT/JP2022/045019 with English language translation thereof.

* cited by examiner

HYDRAULIC SYSTEM OF WORKING MACHINE AND METHOD FOR CONTROLLING HYDRAULIC SYSTEM OF WORKING MACHINE

CROSS REFERENCE TO RELATED APPLICATIONS

This application is a continuation application of International Application No. PCT/JP2022/045019, filed on Dec. 7, 2022, which claims the benefit of priority to Japanese Patent Application No. 2021-214936, filed on Dec. 28, 2021. The entire contents of each of these applications are hereby incorporated herein by reference.

BACKGROUND OF THE INVENTION

1. Field of the Invention

The present invention relates to a hydraulic system of a working machine and a method for controlling a hydraulic system of a working machine.

2. Description of the Related Art

Conventionally, an electronic cushion controller of a hydraulic cylinder disclosed in Japanese Unexamined Patent Application Publication No. 2010-261521 is known.

The electronic cushion controller of the hydraulic cylinder of Japanese Unexamined Patent Application Publication No. 2010-261521 includes a hydraulic cylinder that includes a cylinder body and a piston sliding in the cylinder body and is for driving a work attachment of a construction machine, a feed/discharge amount adjuster for changing a feed/discharge amount of a hydraulic fluid to the hydraulic cylinder, and a controller that electrically controls actuation of the feed/discharge amount adjuster, and the controller adjusts the feed/discharge amount of the hydraulic fluid to the hydraulic cylinder by actuating the feed/discharge amount adjuster and thus performs cushion control of decelerating the piston toward a stroke end of the cylinder body.

SUMMARY OF THE INVENTION

In the electronic cushion controller of the hydraulic cylinder of Patent Literature 1, a stroke end detector in the controller (control unit) detects approach to a stroke end on the basis of a rotation angle of a boom, and an actuation controller in the control unit decelerates a piston rod so that the piston rod slowly stops by actuating the electromagnetic proportional valve upon receipt of detection information from the stroke end detector.

However, in a case where a piston rod is decelerated from a vicinity of a stoke end as in the invention disclosed in Patent Literature 1, the deceleration of the piston rod is sometimes insufficient or a step sometimes occurs in operation speed due to significant deceleration of a hydraulic cylinder.

In view of the above problems, an object of the present invention is to provide a hydraulic system of a working machine and a method for controlling a hydraulic system of a working machine that make it possible to smoothly decelerate swing of a movable member.

A hydraulic system of a working machine according to an aspect of the present invention includes a working device that includes a movable member and a hydraulic cylinder that swings the movable member; an electromagnetic proportional valve to change a flow rate of a hydraulic fluid supplied to the hydraulic cylinder; and a controller to control the flow rate of the hydraulic fluid supplied to the hydraulic cylinder to a predetermined flow rate or less by controlling an electric current supplied to the electromagnetic proportional valve, in which the controller includes: a first calculator to calculate a first electric current value, which is an electric current value of an electric current supplied to the electromagnetic proportional valve in order to control the electromagnetic proportional valve to decelerate an angular velocity of the movable member as an operation length of the hydraulic cylinder approaches a stroke end of the hydraulic cylinder, a second calculator to calculate a second electric current value, which is an electric current value of an electric current supplied to the electromagnetic proportional valve in order to control the electromagnetic proportional valve to decrease a supply flow rate of the hydraulic fluid to the hydraulic cylinder as the operation length of the hydraulic cylinder approaches the stroke end of the hydraulic cylinder, and an electric current restrictor to correct the electric current supplied to the electromagnetic proportional valve by the second electric current value in a case where a determination distance, which is an operation length from a current operation position of the hydraulic cylinder to the stroke end, is longer than a first threshold value and is equal to or less than a second threshold value longer than the first threshold value and to correct the electric current supplied to the electromagnetic proportional valve by a selected one of the first electric current value and the second electric current value in a case where the determination distance is equal to or less than the first threshold value.

The hydraulic system may be configured such that the first calculator does not calculate the first electric current value in a case where the determination distance is longer than the first threshold value; and the second calculator does not calculate the second electric current value in a case where the determination distance is longer than the second threshold value.

The hydraulic system may be configured such that the first electric current value in a case where the determination distance is the first threshold value is an electric current value corresponding to a reference angular velocity, which is a minimum value of the angular velocity in a case where the flow rate of the hydraulic fluid supplied to the hydraulic cylinder is the predetermined flow rate; and the first electric current value in a case where the determination distance is zero is an electric current value corresponding to a predetermined terminal angular velocity smaller than the reference angular velocity.

The hydraulic system may be configured such that the second electric current value in a case where the determination distance is the second threshold value is an electric current value for supplying the hydraulic fluid at a flow rate substantially equal to the predetermined flow rate to the hydraulic cylinder.

The hydraulic system may be configured such that the electric current restrictor selects one of the first electric current value and the second electric current value that is smaller in the flow rate of the hydraulic fluid supplied to the hydraulic cylinder in a case where the determination distance is equal to or less than the first threshold value.

The hydraulic system may be configured such that the electric current restrictor corrects the electric current supplied to the electromagnetic proportional valve by the first electric current value in a case where the determination distance is equal to or less than the first threshold value.

The hydraulic system may be configured to further include a first operation device that outputs an operation signal to the controller, in which the controller includes a definer to define, on a basis of the operation signal, the electric current supplied to the electromagnetic proportional valve within a range equal to or less than a reference electric current value at which an opening of the electromagnetic proportional valve is maximum and the flow rate of the hydraulic fluid supplied to the hydraulic cylinder is the predetermined flow rate, and the electric current restrictor corrects the electric current value defined by the definer by the first electric current value or the second electric current value.

The hydraulic system may be configured to further include a second operation device that is operable; an operation valve to control a flow rate of an ejected pilot oil in accordance with operation of the second operation device; a direction switching valve to control the hydraulic cylinder by changing a switching position by the pilot oil supplied from the operation valve and changing the flow rate of the hydraulic fluid supplied to the hydraulic cylinder; and a connecting oil passage to connect the direction switching valve and the hydraulic cylinder, in which the electromagnetic proportional valve is provided in the connecting oil passage, and changes the opening in accordance with the electric current supplied from the controller and changes the flow rate of the hydraulic fluid supplied from the direction switching valve to the hydraulic cylinder to the predetermined flow rate or less.

A method according to an aspect of the present invention for controlling a hydraulic system of a working machine including a working device that includes a movable member and a hydraulic cylinder that swings the movable member and an electromagnetic proportional valve to change a flow rate of a hydraulic fluid supplied to the hydraulic cylinder, in which the flow rate of the hydraulic fluid supplied to the hydraulic cylinder is controlled to a predetermined flow rate or less by controlling an electric current supplied to the electromagnetic proportional valve, includes a first step of calculating a first electric current value, which is an electric current value of an electric current supplied to the electromagnetic proportional valve in order to control the electromagnetic proportional valve to decelerate an angular velocity of the movable member as an operation length of the hydraulic cylinder approaches a stroke end of the hydraulic cylinder, a second step of calculating a second electric current value, which is an electric current value of an electric current supplied to the electromagnetic proportional valve in order to control the electromagnetic proportional valve to decrease a supply flow rate of the hydraulic fluid to the hydraulic cylinder as the operation length of the hydraulic cylinder approaches the stroke end of the hydraulic cylinder; and a third step of correcting the electric current supplied to the electromagnetic proportional valve by the second electric current value in a case where a determination distance, which is an operation length from a current operation position of the hydraulic cylinder to the stroke end, is longer than a first threshold value and is equal to or less than a second threshold value longer than the first threshold value and correcting the electric current supplied to the electromagnetic proportional valve by one of the first electric current value and the second electric current value that is smaller in the flow rate of the hydraulic fluid supplied to the hydraulic cylinder in a case where the determination distance is equal to or less than the first threshold value.

The above and other elements, features, steps, characteristics and advantages of the present invention will become more apparent from the following detailed description of the example embodiments with reference to the attached drawings.

BRIEF DESCRIPTION OF THE DRAWINGS

A more complete appreciation of example embodiments of the present invention and many of the attendant advantages thereof will be readily obtained as the same becomes better understood by reference to the following detailed description when considered in connection with the accompanying drawings described below.

DETAILED DESCRIPTION OF THE EXAMPLE EMBODIMENTS

Figure 1:
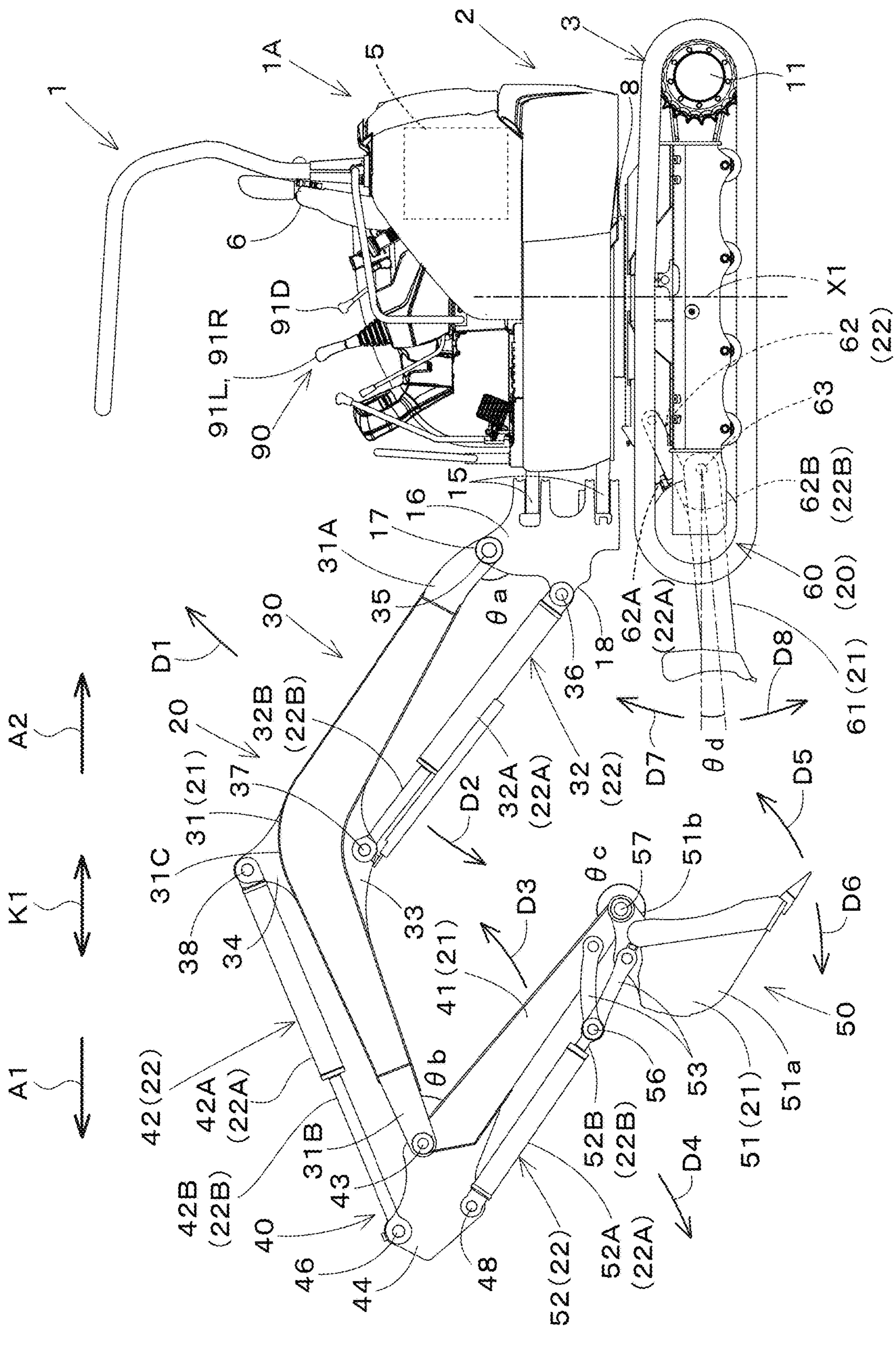
FIG. 1 is a schematic side view of a working machine in the first embodiment.

Example embodiments will now be described with reference to the accompanying drawings, wherein like reference numerals designate corresponding or identical elements throughout the various drawings. The drawings are to be viewed in an orientation in which the reference numerals are viewed correctly.

The following description discusses embodiments of the present invention with reference to the drawings as appropriate.

First Embodiment

FIG. 1 is a schematic side view of a working machine 1 according to a first embodiment. In the present embodiment, a backhoe, which is a swivel working machine, is illustrated as a working machine 1.

As illustrated in FIG. 1, the working machine 1 includes a traveling body 1A and a working device 20 attached to the traveling body 1A. The traveling body 1A includes a traveling device 3 and a machine body (swivel base) 2 mounted on the traveling device 3. The machine body 2 is provided with an operator's seat 6 on which an operator sits.

Hereinafter, a direction (a direction indicated by arrow A1 in FIG. 1) in which the operator sitting on the operator's seat 6 of the working machine 1 faces is referred to as a forward direction, and an opposite direction (a direction indicated by arrow A2 in FIG. 1) is referred to as a rearward direction. Furthermore, a left side as viewed from the operator (a near side in FIG. 1) is referred to as a leftward direction, and a right side (a far side in FIG. 1) is referred to as a rightward direction. Note that a direction orthogonal to a front-rear direction K1 of the machine body 2 is sometimes referred to as a machine body width direction (width direction).

As illustrated in FIG. 1, the traveling device 3 is a device that supports the machine body 2 in a travelable manner. The traveling device 3 is driven by a traveling motor 11 such as a hydraulic motor (hydraulic actuator) or an electric motor. Note that although a crawler-type traveling device 3 is used in the present embodiment, the traveling device 3 is not limited to this and may be, for example, a wheel-type traveling device 3.

The machine body 2 is supported on the traveling device 3 with a swivel bearing 8 interposed therebetween so as to be capable of swiveling about a swivel axis X1. The swivel axis X1 is an axis extending in an up-down direction passing a center of the swivel bearing 8.

The machine body 2 is provided with a prime mover 5. The prime mover 5 is a diesel engine. Note that the prime mover 5 may be a gasoline engine or an electric motor or may be a hybrid type including an engine and an electric motor.

The machine body 2 includes, on a front portion thereof, a support bracket 15 that supports a boom device 30, which will be described later, and a swing bracket 16. The support bracket 15 protrudes forward from the machine body 2. The swing bracket 16 is attached to a front portion (a portion protruding from the machine body 2) of the support bracket 15 with the use of a swing shaft so as to be swingable about a vertical axis (an axis extending in the up-down direction). Accordingly, the swing bracket 16 is rotatable in the machine body width direction (in a horizontal direction about the swing shaft).

The working device 20 includes a movable member 21 and a hydraulic cylinder 22 that swings the movable member 21. The hydraulic cylinder 22 performs linear driving of extending or contracting upon supply of a hydraulic fluid and thereby swings the movable member 21 about a rotary axis. The hydraulic cylinder 22 includes a cylinder portion 22A having a cylindrical shape and a piston rod 22B whose one end side is slidably inserted into the cylinder portion 22A.

As illustrated in FIG. 1, in the present embodiment, the working device 20 includes a boom device 30, an arm device 40, a working tool device 50, and a dozer device 60.

The boom device 30 includes a boom 31, which is the movable member 21, and a boom cylinder 32, which is the hydraulic cylinder 22. The boom 31 includes a base portion 31A that is supported on a first pivotally supporting portion 17 of the swing bracket 16 so as to be swingable (rotatable) about a horizontal shaft (rotary shaft) 35 extending in the machine body width direction, a leading end portion 31B that swingably supports an arm 41, and an intermediate portion 31C provided between the base portion 31A and the leading end portion 31B. The intermediate portion 31C has an elongated shape along a longitudinal direction and is bent downward at an intermediate point. A lower bracket 33 is provided on one side (a lower portion) of the bent portion of the intermediate portion 31C, and an upper bracket 34 is provided on the other side (an upper portion) of the bent portion of the intermediate portion 31C.

The boom cylinder 32 can swing the boom 31 by extending or contracting. The boom cylinder 32 includes a cylinder portion 32A having a cylindrical shape and a piston rod 32B whose one end side is slidably inserted into the cylinder portion 32A. A base end portion of the cylinder portion 32A is supported on a second pivotally supporting portion 18 of the swing bracket 16 so as to be swingable about a horizontal shaft 36. A leading end portion of the piston rod 32B is supported on the lower bracket 33 so as to be swingable about a horizontal shaft 37.

The boom cylinder 32 is disposed on the boom 31 so as to face the arm 41 when the arm 41 swings in an arm crowd direction D3. That is, the boom cylinder 32 is provided on a lower portion of the boom 31 on a front face side.

Accordingly, the boom cylinder 32 (the hydraulic cylinder 22) can swing the boom 31 (the movable member 21) about the horizontal shaft (rotary shaft) 35. That is, as illustrated in FIG. 1, the boom 31 is swingable in a boom raising direction D1, which is an upward direction, and in a boom lowering direction D2, which is a downward direction.

Note that in the present embodiment, the boom cylinder 32 can swing the boom 31 in the boom raising direction D1 by extending. Furthermore, the boom cylinder 32 can swing the boom 31 in the boom lowering direction D2 by contracting.

The arm device 40 includes the arm 41, which is the movable member 21, and an arm cylinder 42, which is the hydraulic cylinder 22. The arm 41 has an elongated shape along the longitudinal direction. A base end portion of the arm 41 is supported on the leading end portion 31B of the boom 31 so as to be swingable about a horizontal shaft (rotary shaft) 43. An upper bracket 44 is provided on an upper surface side of the base end portion of the arm 41.

The arm cylinder 42 can swing the arm 41 by extending or contracting. The arm cylinder 42 includes a cylinder portion 42A having a cylindrical shape and a piston rod 42B whose one end side is slidably inserted into the cylinder portion 42A. A base end portion of the cylinder portion 42A is supported on the upper bracket 34 of the boom 31 so as to be swingable about a horizontal axis 38. A leading end portion of the piston rod 42B is supported on the upper bracket 44 so as to be swingable about a horizontal shaft 46.

Accordingly, the arm cylinder 42 (the hydraulic cylinder 22) can swing the arm 41 (the movable member 21) about the horizontal shaft (rotary shaft) 43. Therefore, the arm device 40 (the arm 41) is swingable in an upward direction or downward direction (the forward direction or rearward direction). That is, as illustrated in FIG. 1, the arm 41 is swingable in the arm crowd direction D3 toward the boom 31 and in an arm dump direction D4 farther away from the boom 31.

Note that in the present embodiment, the arm cylinder 42 can swing the arm 41 in the arm crowd direction D3 by extending. Furthermore, the arm cylinder 42 can swing the arm 41 in the arm dump direction D4 by contracting.

The working tool device 50 includes a working tool 51, which is the movable member 21, and a working tool cylinder 52, which is the hydraulic cylinder 22. In the present embodiment, the working tool 51 is a bucket, and the working tool cylinder 52 is a bucket cylinder. The bucket 51 is supported on a leading end portion of the arm 41 so as to be swingable about a pivot shaft (rotary shaft) 57. A link mechanism 53 is provided between the bucket 51 and the leading end portion of the arm 41. The bucket 51 includes a bucket body 51*a*, which is a portion for shoveling sand or the like, and an attachment bracket 51*b*, which is a portion attached to the arm 41 and the link mechanism 53.

The bucket cylinder 52 can swing the bucket 51 by extending or contracting. The bucket cylinder 52 includes a cylinder portion 52A having a cylindrical shape and a piston rod 52B whose one end side is slidably inserted into the cylinder portion 52A. A base end portion of the cylinder portion 52A is supported on the upper bracket 44 of the arm 41 so as to be swingable about a horizontal shaft 48. A leading end portion of the piston rod 52B is supported on the link mechanism 53 so as to be swingable about a horizontal shaft 56.

Accordingly, the bucket cylinder 52 (the hydraulic cylinder 22) can swing the bucket 51 (the movable member 21) about the pivot shaft (rotary shaft) 57. Therefore, the bucket 51 can perform a crowd action (shovel action) and a dump action at a tip of the arm 41. That is, as illustrated in FIG. 1, the bucket 51 can swing in a bucket crowd direction (working tool crowd direction) D5, in which a leading end portion of the bucket 51 is brought closer to the boom 31 (the arm 41), and in a bucket dump direction (working tool dump direction) D6, in which the leading end portion of the bucket 51 is brought farther away from the boom 31 (the arm 41). The crowd action (shovel action) is, for example, an action for shoveling sand or the like. The dump action is, for example, an action for dropping (getting rid of) the shoveled sand or the like.

Note that although the working tool 51 is a bucket in the present embodiment, another working tool (hydraulic attachment) that can be driven by a hydraulic actuator can be attached to the working machine 1 instead of the bucket or in addition to the bucket. Examples of the other working tool include a hydraulic breaker, a hydraulic crusher, an angle broom, an earth auger, a pallet fork, a sweeper, a mower, and a snow blower.

The dozer device 60 includes a dozer 61, which is the movable member 21, and a dozer cylinder 62, which is the hydraulic cylinder 22. A base end portion of the dozer 61 is pivotally supported on a frame (track frame) of the traveling device 3 so as to be swingable up and down about a swing shaft (rotary shaft) 63.

The dozer cylinder 62 can swing the dozer 61 by extending or contracting. The dozer cylinder 62 includes a cylinder portion 62A having a cylindrical shape and a piston rod 62B whose one end side is slidably inserted into the cylinder portion 62A. A base end portion of the cylinder portion 62A is swingably supported on the track frame of the traveling device 3 at a position above the dozer 61. A leading end portion of the piston rod 62B is swingably supported on an intermediate portion of the dozer 61.

Accordingly, the dozer cylinder 62 (the hydraulic cylinder 22) can swing the dozer 61 about the swing shaft 63. Therefore, the dozer device 60 (the dozer 61) is swingable in an upward direction or a downward direction. That is, as illustrated in FIG. 1, the dozer 61 is swingable in a dozer raising direction D7, which is an upward direction, and a dozer lowering direction D8, which is a downward direction.

Note that in the present embodiment, the dozer cylinder 62 can swing the dozer 61 in the dozer raising direction D7 by contracting. The dozer cylinder 62 can swing the dozer 61 in the dozer lowering direction D8 by extending.

Although a case where the working device 20 includes the boom device 30, the arm device 40, the working tool device 50, and the dozer device 60 has been described as an example in the present embodiment, the working device 20 need just include the movable member 21 and the hydraulic cylinder 22, and is not limited to the boom device 30, the arm device 40, the working tool device 50, and the dozer device 60. For example, the working device 20 may include a swing device including the swing bracket 16. In this case, the swing device includes the swing bracket 16 as the movable member 21 and a swing cylinder (not illustrated) as the hydraulic cylinder 22. The swing cylinder is provided in the machine body 2 and swings the swing bracket 16 in the machine body width direction by extending.

Figure 2:
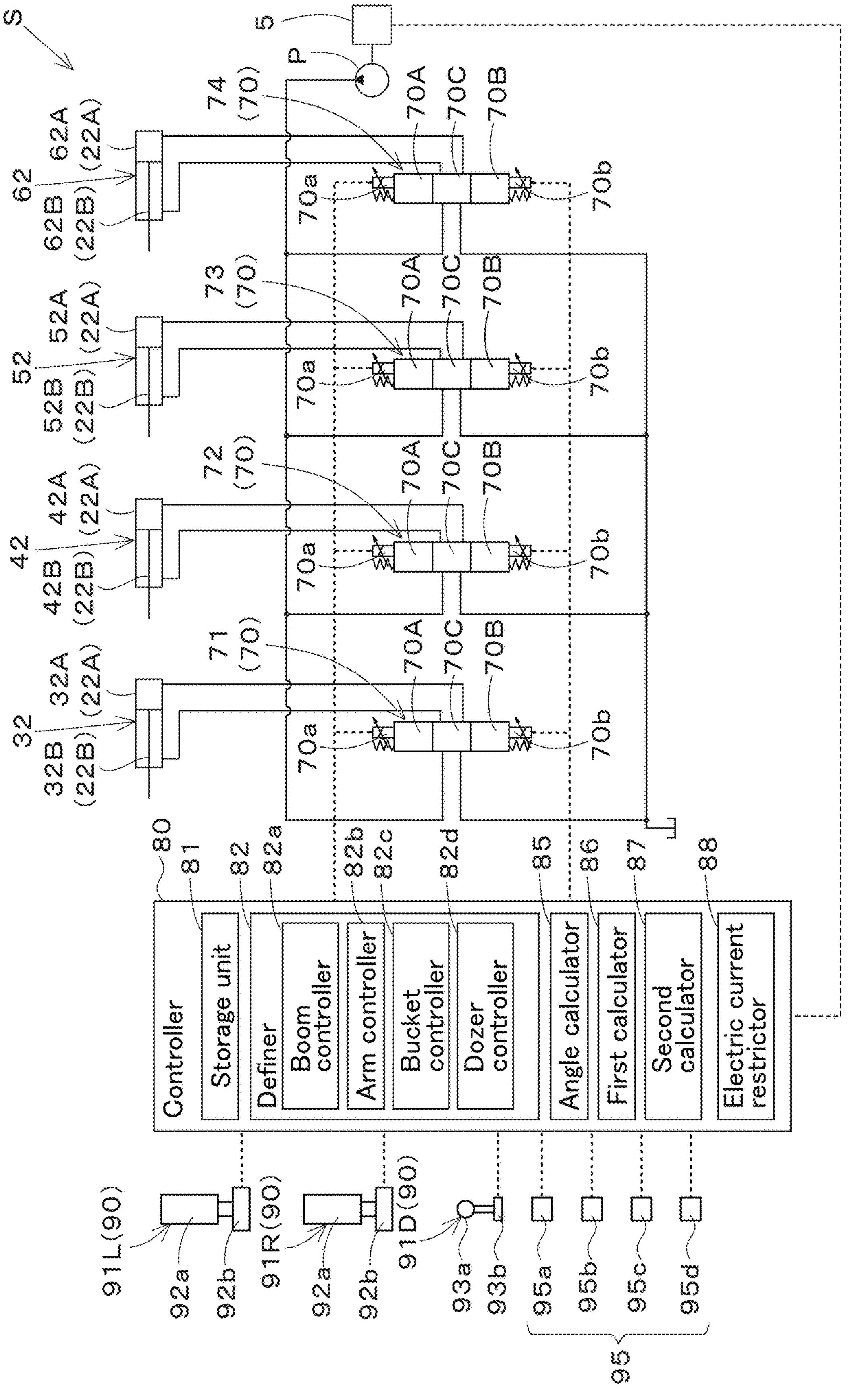
FIG. 2 illustrates a hydraulic system of the working machine in the first embodiment.

FIG. 2 illustrates a hydraulic system S of the working machine 1 according to the first embodiment. As illustrated in FIG. 2, the hydraulic system S of the working machine 1 includes an electromagnetic proportional valve 70, a controller 80, and a first operation device 90.

The electromagnetic proportional valve 70 is a switching valve that can change a flow rate of a hydraulic fluid supplied to the hydraulic cylinder 22. Specifically, the electromagnetic proportional valve 70 changes a flow direction (supply direction) and a flow rate of the hydraulic fluid supplied to the hydraulic cylinder 22 by changing a switching position on the basis of an electric current supplied from the controller 80. In the present embodiment, the electromagnetic proportional valve 70 is a direct operated solenoid valve that controls a flow of the hydraulic fluid by moving a direct acting spool (hereinafter referred to simply as a spool) by solenoids 70*a* and 70*b*. The spool is switchable among a first position 70A, a second position 70B, and a third position (neutral position) 70C, which are switching positions.

The solenoids 70*a* and 70*b* can switch between energization and deenergization in accordance with a magnitude of supplied electric current (electric current value I). Of the solenoids 70*a* and 70*b*, the first solenoid 70*a* is provided on one end side of the spool, and the second solenoid 70*b* is provided on the other end side of the spool, and continuously changes the position of the spool among the first position 70A, the second position 70B, and the third position 70C by changing an intensity of energization in accordance with the supplied electric current value I. In this way, the electromagnetic proportional valve 70 can continuously changes the flow rate (output) of the hydraulic fluid supplied from the hydraulic pump P to the hydraulic cylinder 22 and switch a supply direction of the hydraulic fluid.

Note that the following describes, as examples, a case where an electric current is supplied to the first solenoid 70*a* and no electric current is supplied to the second solenoid 70*b*, a case where the switching position of the spool is switched to the first position 70A, the hydraulic cylinder 22 contracts, and no electric current is supplied to the first solenoid 70*a* and an electric current is supplied to the second solenoid 70*b*, and a case where the switching position of the spool is switched to the second position 70B and the hydraulic cylinder 22 extends.

The solenoids 70*a* and 70*b* may change the position of the spool among the first position 70A, the second position 70B, and the third position 70C in stages in accordance with the electric current value I of the supplied electric current. In this case, the electromagnetic proportional valve 70 can change the flow rate (output) of the hydraulic fluid supplied from the hydraulic pump P to the hydraulic cylinder 22 in stages and switch a supply direction of the hydraulic fluid.

The electromagnetic proportional valve 70 is not limited to the above configuration, and may be, for example, an electromagnetic three-position switching valve in which a solenoid valve is incorporated and the position of the spool is switched by a hydraulic fluid (pilot oil) supplied from a pump (not illustrated) different from the hydraulic pump P. The electromagnetic proportional valve 70 is not limited to the configuration in which a solenoid valve is incorporated, and a direct acting spool (direction switching valve) and a solenoid valve may be separate members. The electromagnetic proportional valve 70 is not limited to the three-position switching valve and may be a two-position switching valve, a four-position switching valve, or the like.

As illustrated in FIG. 2, in the present embodiment, a boom control valve 71, an arm control valve 72, a bucket control valve 73, and a dozer control valve 74 are provided as the electromagnetic proportional valve 70. The boom control valve 71, the arm control valve 72, the bucket control valve 73, and the dozer control valve 74 are connected to the boom cylinder 32, the arm cylinder 42, the bucket cylinder 52, and the dozer cylinder 62 by oil passages, respectively. The hydraulic pump P that ejects a hydraulic fluid is connected to each of the boom control valve 71, the arm control valve 72, the bucket control valve 73, and the dozer control valve 74 by an oil passage.

The controller 80 controls an electric current supplied to the solenoids 70*a* and 70*b* of the electromagnetic proportional valve 70 (the boom control valve 71, the arm control valve 72, the bucket control valve 73, and the dozer control valve 74).

The controller 80 is a device that is constituted by an electric/electronic circuit, a program stored in a CPU, an MPU, or the like, and the like. The controller 80 controls various devices of the working machine 1. The controller 80 can control the working device 20 on the basis of operation of the first operation device 90. Specifically, the controller 80 controls magnitudes of electric currents (electric current values I) supplied to the solenoids 70*a* and 70*b* of the boom control valve 71, the arm control valve 72, the bucket control valve 73, and the dozer control valve 74 on the basis of operation of the first operation device 90 and thereby controls switching operations of these control valves. The controller 80 can thus control operations of the boom 31, the arm 4, the bucket 51, and the dozer device 60. As illustrated in FIG. 2, the controller 80 includes a storage unit 81. The storage unit 81 is a non-volatile memory or the like and stores therein various kinds of information concerning control of the controller 80 and the like.

The first operation device 90 is an operation actuator for operating the working device 20. The first operation device 90 is, for example, a lever gripped by an operator during operation and is provided in the vicinity of the operator's seat 6. The first operation device 90 is connected to the controller 80 and outputs an operation signal indicative of an operation direction and an operation amount to the controller 80.

As illustrated in FIG. 2, the first operation device 90 includes maneuvering devices 91L and 91R and a dozer operation device 91D. Each of the maneuvering devices 91L and 91R includes an operation lever 92*a* and a position sensor 92*b*. The operation lever 92*a* is swingable forward, rearward, rightward, and leftward from a neutral position, and the position sensor 92*b* detects a swing direction and a swing amount (operation amount) of the forward, rearward, rightward, or leftward swing of the operation lever 92*a* from the neutral position. The operation lever 92*a* outputs an electric signal (operation signal) indicative of a swing direction and a swing amount detected by the position sensor 92*b* to the controller 80.

The dozer operation device 91D includes an operation lever 93*a* and a position sensor 93*b*. The operation lever 93*a* is swingable forward and rearward from a neutral position, and the position sensor 93*b* detects a swing direction and a swing amount (operation amount) of the forward or rearward swing of the operation lever 93*a* from the neutral position. The operation lever 93*a* outputs an electric signal (operation signal) indicative of a swing direction and a swing amount detected by the position sensor 93*b* to the controller 80.

The following describes control of the working device 20 by the controller 80 based on operation of the first operation device 90. The controller 80 controls a flow rate of a hydraulic fluid supplied to the hydraulic cylinder 22 to a predetermined flow rate or less by controlling an electric current supplied to the electromagnetic proportional valve 70. Specifically, the controller 80 controls an electric current (supply electric current) supplied to the electromagnetic proportional valve 70 in a range equal to or less than a predetermined reference electric current value IB.

As illustrated in FIG. 2, the controller 80 includes a definer 82 that defines the supply electric current on the basis of an operation signal output from the first operation device 90. The definer 82 defines a magnitude of electric current (electric current value I) supplied to the electromagnetic proportional valve 70 corresponding to an operation target indicated by an operation signal within a range equal to or less than the reference electric current value IB ($I \leq IB$) on the basis of the operation signal and a control map or a predetermined arithmetic formula stored in advance in the storage unit 81. In the present embodiment, the definer 82 defines the magnitude of electric current within a range equal to or greater than a minimum electric current value IA and equal to or less than the reference electric current value IB ($IA \leq I \leq IB$). The minimum electric current value IA is a minimum electric current value I by which an opening of the electromagnetic proportional valve 70 can be adjusted. The reference electric current value IB is an electric current (maximum electric current value) that maximizes the opening of the electromagnetic proportional valve 70, and the electromagnetic proportional valve 70 to which an electric current of the reference electric current value IB is supplied supplies a hydraulic fluid to the hydraulic cylinder 22 at a maximum flow rate (the predetermined flow rate).

Figure 3:
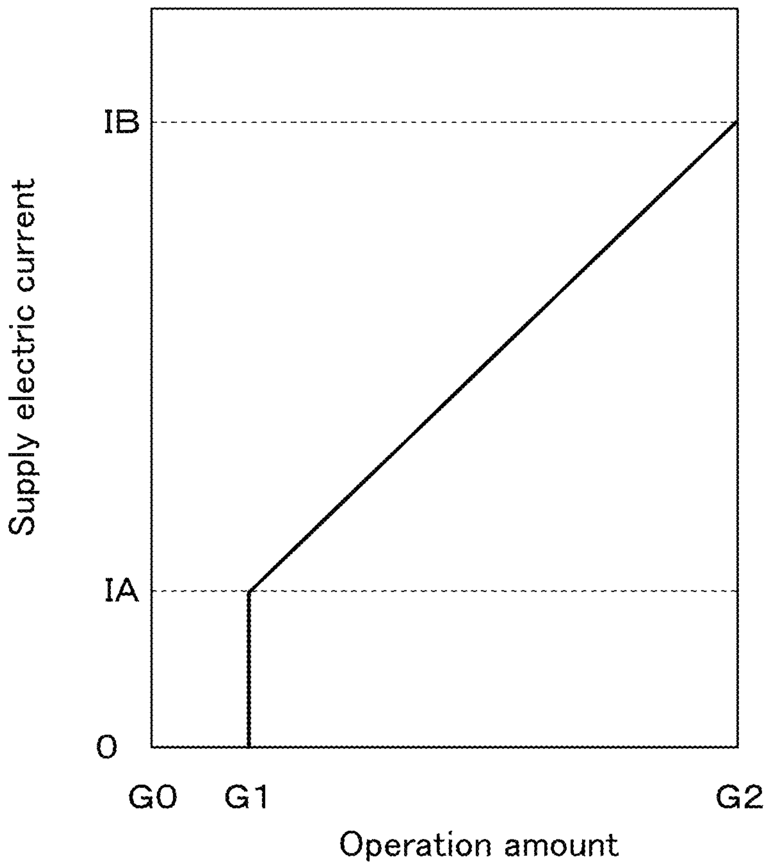
FIG. 3 illustrates a relationship between an operation amount of a first operation device and a supply electric current in the first embodiment.

FIG. 3 illustrates an example of a relationship between an operation amount of the first operation device 90 and the supply electric current in the first embodiment. In a case where the first operation device 90 is around the neutral position, that is, in a case where the operation amount is less than a first operation amount G1, the definer 82 defines the supply electric current to zero.

In a case where the operation amount of the first operation device 90 is equal to or greater than the first operation amount G1 and equal to or less than a second operation amount G2, the definer 82 changes the supply electric current in proportion to the operation amount of the first operation device 90 or in a correspondence relationship (correlation relationship) close to the proportional relationship.

Specifically, as illustrated in FIG. 2, the definer 82 includes a boom controller 82*a*, an arm controller 82*b*, a bucket controller 82*c*, and a dozer controller 82*d*. The boom controller 82*a* defines an electric current (supply electric current) supplied to the boom control valve 71 on the basis of an operation signal output from the position sensor 92*b* of the maneuvering device 91R. The controller 80 thus switches the boom control valve 71 by supplying the defined supply electric current to the first solenoid 70*a* and the second solenoid 70*b* of the boom control valve 71.

The arm controller 82*b* defines an electric current (supply electric current) supplied to the arm control valve 72 on the basis of an operation signal output from the position sensor 92*b* of the maneuvering device 91L. The controller 80 thus switches the arm control valve 72 by supplying the defined supply electric current to the first solenoid 70*a* and the second solenoid 70*b* of the arm control valve 72.

The bucket controller 82*c* defines an electric current (supply electric current) supplied to the bucket control valve 73 on the basis of an operation signal output from the operation lever 92*a* of the maneuvering device 91R. The controller 80 thus switches the bucket control valve 73 by supplying the defined supply electric current to the first solenoid 70*a* and the second solenoid 70*b* of the bucket control valve 73.

The dozer controller 82*d* defines an electric current (supply electric current) supplied to the dozer control valve 74 on the basis of an operation signal output from the operation lever 93*a* of the dozer maneuvering device 91D. The controller 80 thus switches the dozer control valve 74 by supplying the defined supply electric current to the first solenoid 70*a* and the second solenoid 70*b* of the dozer control valve 74.

The controller 80 can perform cushion control of decelerating the piston rod 22B when the hydraulic cylinder 22 approaches a stroke end (terminal end) E. When the hydraulic cylinder 22 approaches the stroke end E, the controller 80 performs cushion control of decreasing a hydraulic fluid supplied to the hydraulic cylinder 22 by restricting a magnitude of electric current (electric current value I) supplied to the electromagnetic proportional valve 70. Specifically, during the cushion control, the controller 80 decreases the hydraulic fluid supplied to the hydraulic cylinder 22 by limiting the electric current supplied to the electromagnetic proportional valve 70 on the basis of a determination distance H, which is an operation length L from a current operation position of the hydraulic cylinder 22 to the stroke end E.

Figure 4:
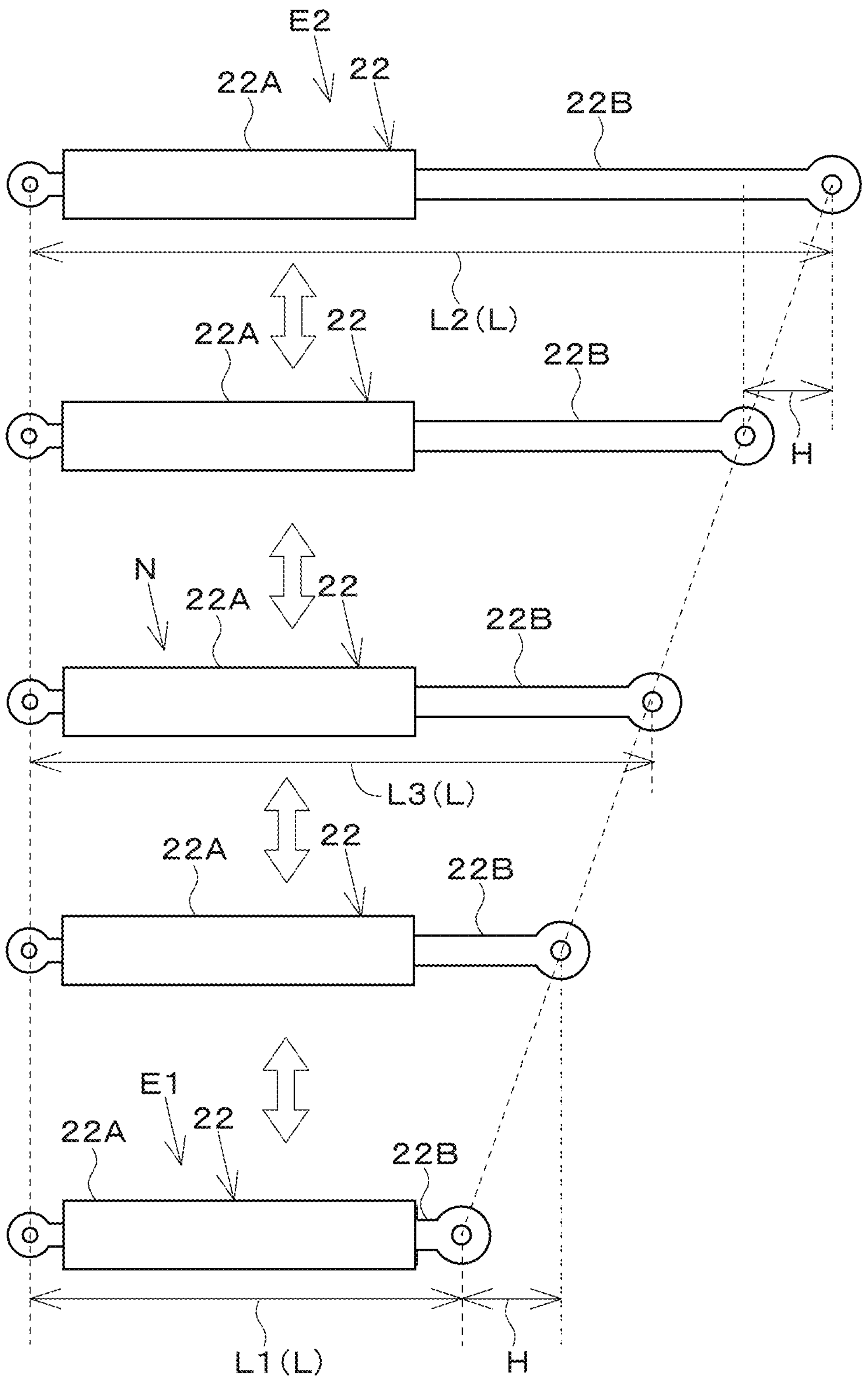
FIG. 4 is a view for explaining an operation length of a hydraulic cylinder in the first embodiment.

FIG. 4 is a view for explaining the operation length L of the hydraulic cylinder 22 in the first embodiment. The hydraulic cylinder 22 contracts to a first stroke end E1 and extends to a second stroke end E2. That is, in the example illustrated in FIG. 4, the operation length L of the hydraulic cylinder 22 extends from a minimum operation length L1 in a case where the hydraulic cylinder 22 contracts the most (the first stroke end E1) to a maximum operation length L2 in a case where the hydraulic cylinder 22 extends the most (the second stroke end E2). Note that in the following description, an operation length L in a case where the hydraulic cylinder 22 is at a middle (a neutral position N) between the first stroke end E1 and the second stroke end E2 is referred to as a middle operation length L3. The minimum operation length L1, the maximum operation length L2, and the middle operation length L3 vary depending on the hydraulic cylinder 22, specifically, depending on a shape, a structure, and the like of the hydraulic cylinder 22.

In the present embodiment, the controller 80 performs cushion control based on the determination distance H by converting the operation length L into a swing angle (angle) θ of the movable member 21. Note that the controller 80 may perform the cushion control by calculating the operation length L of the hydraulic cylinder 22 from various sensors without converting the operation length L into the swing angle θ or may perform the cushion control on the basis of an operation position of the hydraulic cylinder 22 by converting the determination distance H into the operation position of the hydraulic cylinder 22, as long as the controller 80 can perform the cushion control on the basis of the determination distance H.

The controller 80 performs the cushion control for at least one working device 20 of the working machine 1. In the present embodiment, a case where the controller 80 performs the cushion control on the boom device 30, the arm device 40, the working tool device 50, and the dozer device 60 is described as an example.

As illustrated in FIG. 2, the hydraulic system S of the working machine 1 includes an angle detector 95 that detects the swing angle θ of the movable member 21. The angle detector 95 detects the swing angle θ of the movable member 21 about the rotary shaft and outputs an electric signal (detection signal) indicative of the detected swing angle θ to the controller 80. The angle detector 95 is, for example, a potentiometer. Note that the angle detector 95 may be another angle sensor such as an inertial measurement unit (IMU) as long as the angle detector 95 can detect the swing angle θ of the movable member 21. Alternatively, the swing angle θ may be detected by using a cylinder stroke sensor that detects the operation length L of the hydraulic cylinder 22.

In the present embodiment, the hydraulic system S includes, as the angle detector 95, a boom angle sensor 95*a* that detects a swing angle θa (swing position) of the boom 31, an arm angle sensor 95*b* that detects a swing angle θb (swing position) of the arm 41, a working tool angle sensor (bucket angle sensor) 95*c* that detects a swing angle θc (swing position) about the pivot shaft 57 of the bucket 51 with respect to the leading end portion of the arm 41, and a dozer angle sensor 95*d* that detects a swing angle θd (swing position) of the dozer 61.

The cushion control of the controller 80 is described in detail below. As illustrated in FIG. 2, the controller 80 includes an angle calculator 85, a first calculator 86, a second calculator 87, and an electric current restrictor 88.

The angle calculator 85 acquires a detection signal detected by the angle detector 95 and calculates the swing angle θ of the movable member 21. The angle calculator 85 calculates the swing angle θ on the basis of a map or an arithmetic formula stored in advance in the storage unit 81.

Figure 5:
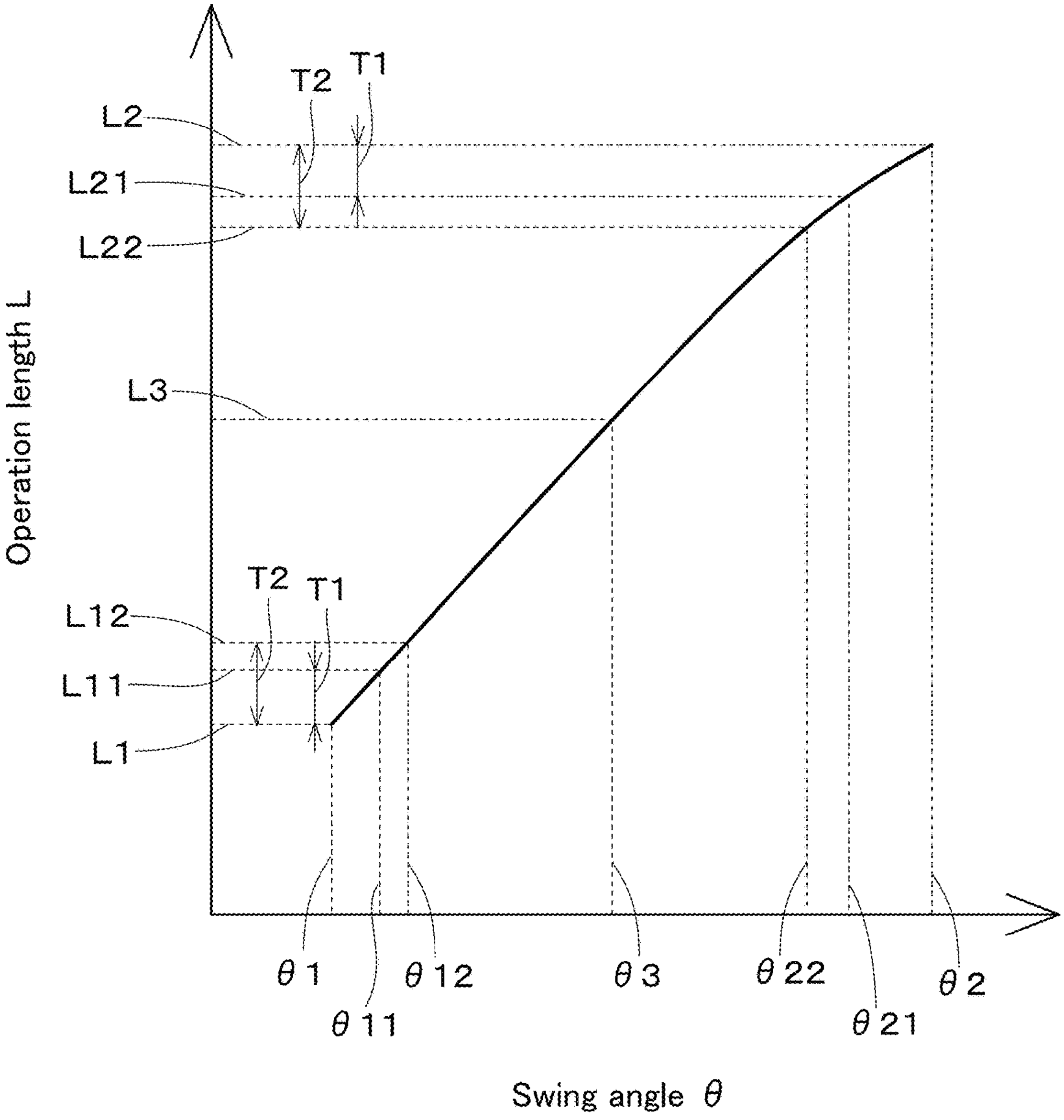
FIG. 5 illustrates an example of a relationship between the operation length of the hydraulic cylinder and an angle of a movable member in the first embodiment.

FIG. 5 illustrates an example of a relationship between the operation length L of the hydraulic cylinder 22 and the swing angle θ of the movable member 21 in the first embodiment. As illustrated in FIG. 5, the operation length L of the hydraulic cylinder 22 increases substantially in proportion to the swing angle θ of the movable member 21. As illustrated in FIG. 5, the swing angle θ of the movable member 21 corresponding to the minimum operation length L1 is a minimum angle θ1, the swing angle θ of the movable member 21 corresponding to the middle operation length L3 is a middle angle θ3, and the swing angle θ of the movable member 21 corresponding to the maximum operation length L2 is a maximum angle θ2.

Therefore, the controller 80 can determine approach of the hydraulic cylinder 22 to the first stroke end E1 on the basis of a change in difference between an actual swing angle θ of the movable member 21 calculated by the angle calculator 85 and the minimum angle θ1. The controller 80 can determine approach of the hydraulic cylinder 22 to the second stroke end E2 on the basis of a change in difference between an actual swing angle θ of the movable member 21 calculated by the angle calculator 85 and the maximum angle θ2.

Note that the relationship between the operation length L of the hydraulic cylinder 22 and the swing angle θ of the movable member 21 illustrated in FIG. 5 is an example and is defined by an arithmetic formula that varies depending on a structure of the working device 20 including the movable member 21 and the hydraulic cylinder 22.

Furthermore, the angle calculator 85 calculates an actual angular velocity ω of the movable member 21 per predetermined time (actual angular velocity or) on the basis of the calculated swing angle θ of the movable member 21.

Figure 6:
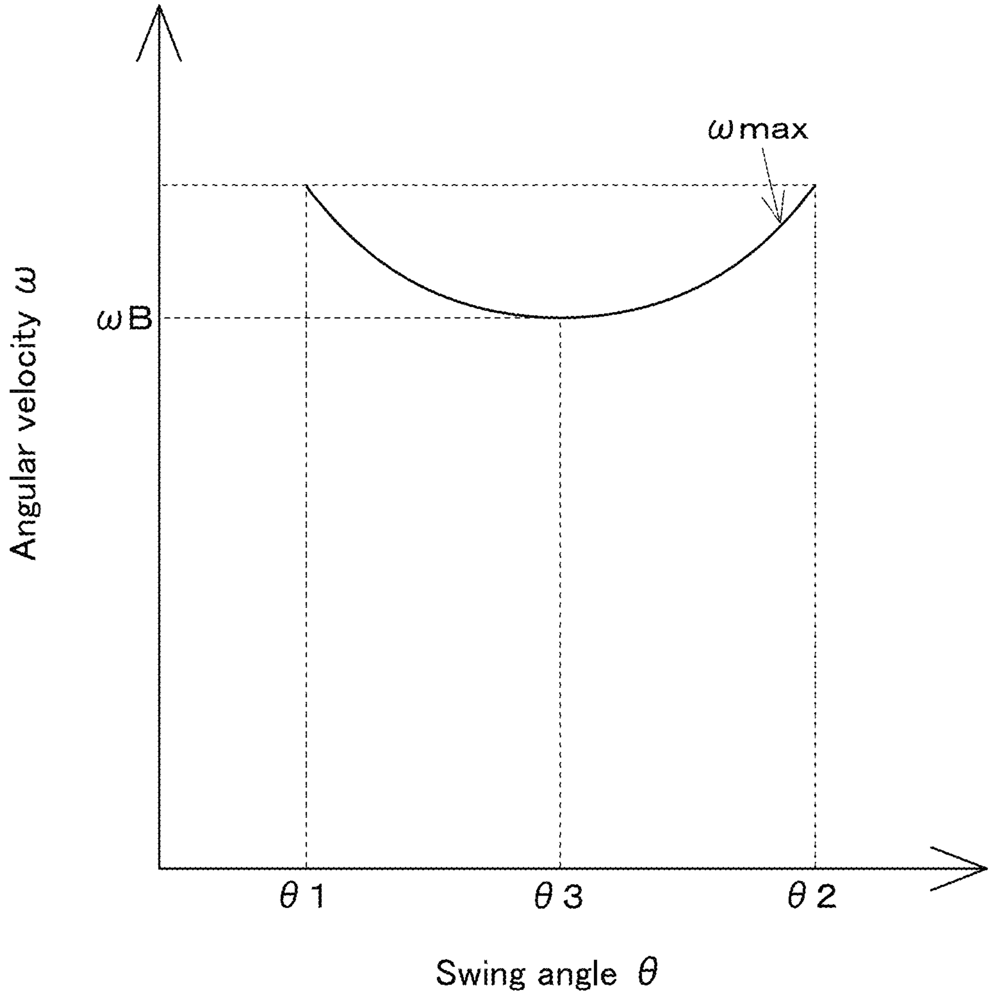
FIG. 6 illustrates a relationship between the angle and an angular velocity of the movable member in a case where a reference electric current value is supplied to an electromagnetic proportional valve in the first embodiment.

Next, a relationship between the swing angle θ and the angular velocity ω of the movable member 21 in a case where the reference electric current value IB is supplied to the electromagnetic proportional valve 70 is described. FIG. 6 illustrates a relationship between the swing angle θ and the angular velocity ω of the movable member 21 in a case where the reference electric current value IB is supplied to the electromagnetic proportional valve 70 in the first embodiment. In the graph of FIG. 6, the horizontal axis represents the swing angle θ of the movable member 21, and the vertical axis represents the angular velocity ω of the movable member 21. Note that since the reference electric current value IB is an electric current value I that maximizes the opening of the electromagnetic proportional valve 70 as described above, the angular velocity ω illustrated in FIG. 6 is a maximum angular velocity (maximum angular velocity) ωmax at a swing position of the movable member 21 corresponding to each swing angle θ. Note that although the maximum angular velocity ωmax at the minimum angle θ1 and the maximum angular velocity ωmax at the maximum angle θ2 are equal in the example of FIG. 6, the maximum angular velocity ωmax at the minimum angle θ1 and the maximum angular velocity ωmax at the maximum angle θ2 may be different.

As described above, the hydraulic cylinder 22 swings the movable member 21 about a rotary shaft 27 by performing linear drive of extending or contracting by a supplied hydraulic fluid, and therefore the maximum angular velocity ωmax at each swing angle θ changes with respect to the swing angle θ so as to draw a downward convex curve, as illustrated in FIG. 6. Specifically, the maximum angular velocity ωmax changes so as to gradually increase and then rapidly increase as the swing angle θ of the hydraulic cylinder 22 decreases from the middle angle θ3 to the minimum angle θ1. Furthermore, the maximum angular velocity ωmax changes so as to gradually increase and then rapidly increase as the swing angle θ of the hydraulic cylinder 22 increases from the middle angle θ3 to the maximum angle θ2.

In the following description, a minimum value of the angular velocity ω within a range from the swing angle θ1 to θ2 is referred to as a "reference angular velocity ωB" in a case where the flow rate of the hydraulic fluid supplied to the hydraulic cylinder 22 is kept constant at the predetermined flow rate. In the example illustrated in FIG. 6, the reference angular velocity ωB is an angular velocity in a case where the swing angle θ of the movable member 21 is the middle angle θ3. Note that a swing position where the angular velocity ω is minimum is not necessarily a position corresponding to the middle angle θ3.

The first calculator 86 calculates a first electric current value I1, which is an electric current value I of an electric current supplied to the electromagnetic proportional valve 70 in order to control the electromagnetic proportional valve 70 to decelerate the angular velocity ω of the movable member 21 as the operation length L of the hydraulic cylinder 22 approaches the stroke end E of the hydraulic cylinder 22. The first calculator 86 calculates the first electric current value I1 in a case where the determination distance H is equal to or less than a first threshold value T1 and does not calculate the first electric current value I1 in a case where the determination distance H is longer than the first threshold value T1.

Specifically, the first calculator 86 calculates a restriction angular velocity ωL that decreases as the determination distance H becomes closer to zero and restricts the angular velocity ω of the movable member 21 in a case where the determination distance H, which is a length to the stroke end E of the hydraulic cylinder 22, is equal to or less than the first threshold value T1. The first threshold value T1 is any value set on the basis of a distance needed to properly decelerate the hydraulic cylinder 22 in the vicinity of the stroke end E in a case where the reference electric current value IB is supplied to the electromagnetic proportional valve 70. The first threshold value T1 is preferably set to as small (short) a value as possible within a range in which proper cushion performance can be obtained, in order not to impair operability of the working device 20.

The restriction angular velocity ωL is a target angular velocity ω during the cushion control, and is defined as an angular velocity ω that decreases as the hydraulic cylinder 22 approaches the stroke end E and can sufficiently decelerate the linear drive of the hydraulic cylinder 22 when the hydraulic cylinder 22 reaches the stroke end E in a case where the determination distance H is equal to or less than the first threshold value T1.

Figure 7:
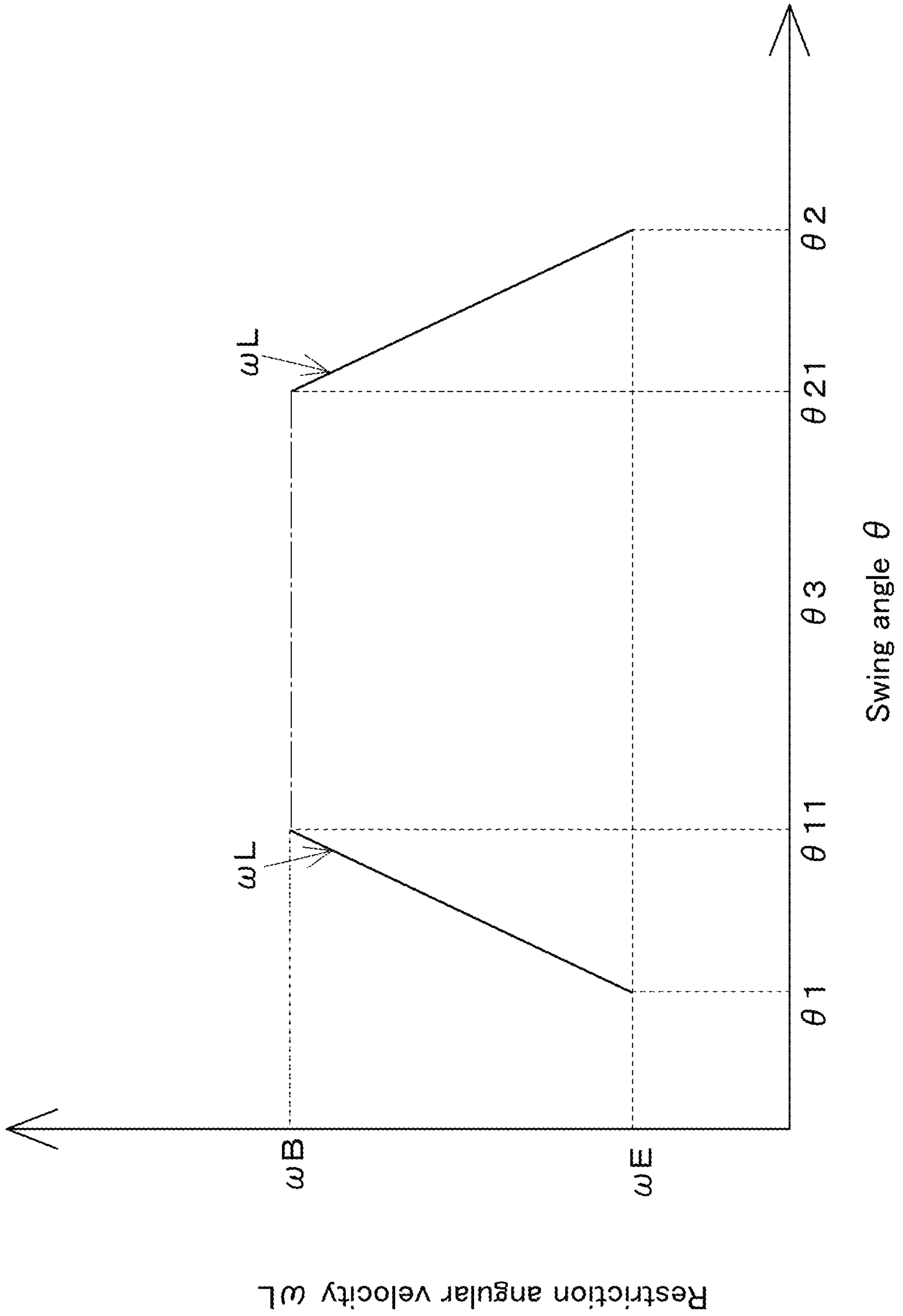
FIG. 7 illustrates an example of a relationship between the angle and a restriction angular velocity of the movable member in the first embodiment.

FIG. 7 illustrates an example of a relationship between the swing angle θ and the restriction angular velocity ωL of the movable member 21 in the first embodiment. As illustrated in FIG. 7, the restriction angular velocity ωL is defined within a range from a reference angular velocity ωB to a terminal angular velocity ωE. The restriction angular velocity ωL decreases substantially in proportion as the swing angle θ of the movable member 21 decreases from a first determination angle θ11, which will be described later, to the minimum angle θ1 and decreases substantially in proportion as the swing angle θ of the movable member 21 increases from a second determination angle θ21, which will be described later, to the maximum angle θ2.

Note that the relationship between the swing angle θ and the restriction angular velocity ωL of the movable member 21 illustrated in FIG. 7 is merely an example. For example, the restriction angular velocity ωL may decrease so as to draw a curve as the swing angle θ of the movable member 21 decreases from the first determination angle θ11 to the minimum angle θ1. Furthermore, the restriction angular velocity ωL may decrease so as to draw a curve as the swing angle θ of the movable member 21 increases from the second determination angle θ21 to the maximum angle θ2. The relationship between the swing angle θ and the restriction angular velocity ωL of the movable member 21 may be defined so as to vary depending on a target (the working device 20) of the cushion control of the controller 80. Although the first threshold value T1 for the stroke end E on the minimum angle θ1 side and the first threshold value T1 for the stroke end E on the maximum angle θ2 side are set to the same value in the present embodiment, this does not imply any limitation, and these threshold values may be different.

As illustrated in FIG. 5, the operation length L in a case where the determination distance H is the first threshold value T1 is a first determination length L11 on the first stroke end E1 side and is a second determination length L21 on the second stroke end E2 side. As illustrated in FIG. 5, the swing angle θ of the movable member 21 corresponding to the first determination length L11 is the first determination angle θ11, and the swing angle θ of the movable member 21 corresponding to the second determination length L21 is the second determination angle θ21. The restriction angular velocity ωL in a case where the swing angle θ of the movable member 21 is the first determination angle θ11 and in a case where the swing angle θ of the movable member 21 is the second determination angle θ21 is the reference angular velocity ωB.

The terminal angular velocity ωE is an angular velocity ω set when the hydraulic cylinder 22 reaches the stroke end E and is an angular velocity ω that can sufficiently decelerate the linear drive of the hydraulic cylinder 22. That is, the terminal angular velocity ωE is a restriction angular velocity ωL set in a case where the swing angle θ of the movable member 21 is the minimum angle θ1 or the maximum angle θ2. The terminal angular velocity ωE is a predetermined angular velocity ω smaller than the reference angular velocity ωB. In the present embodiment, the terminal angular velocity ωE is defined to be zero. Note that the terminal angular velocity ωE is not limited to zero as long as the terminal angular velocity ωE is an angular velocity ω that can sufficiently decelerate the linear drive of the hydraulic cylinder 22 and can reduce shock when the hydraulic cylinder 22 reaches the stroke end E.

Accordingly, the reference angular velocity ωB decreases from the reference angular velocity ωB to the terminal angular velocity ωE as the swing angle θ of the movable member 21 decreases from the first determination angle θ11 to the minimum angle θ1. Furthermore, the reference angular velocity ωB decreases from the reference angular velocity ωB to the terminal angular velocity ωE as the swing angle θ of the movable member 21 increases from the second determination angle θ21 to the maximum angle θ2.

The first calculator 86 calculates the first electric current value I1 corresponding to the restriction angular velocity ωL on the basis of the actual angular velocity or calculated by the angle calculator 85 and the electric current (electric current value I) supplied to the electromagnetic proportional valve 70 by the controller 80. For example, the first calculator 86 calculates the first electric current value I1 corresponding to the restriction angular velocity ωL by feedback control (PID control), feedforward control, or the like. Note that the first calculator 86 may calculate the first electric current value I1 corresponding to the restriction angular velocity ωL on the basis of an arithmetic formula or an arithmetic map stored in the storage unit 81, as long as the first calculator 86 can calculate the first electric current value I1.

In the present embodiment, as the supply electric current increases, the flow rate of the hydraulic fluid supplied from the electromagnetic proportional valve 70 to the hydraulic cylinder 22 increases, and the angular velocity ω increases. As the supply electric current decreases, the flow rate of the hydraulic fluid supplied from the electromagnetic proportional valve 70 to the hydraulic cylinder 22 decreases, and the angular velocity ω decreases.

Figure 8:
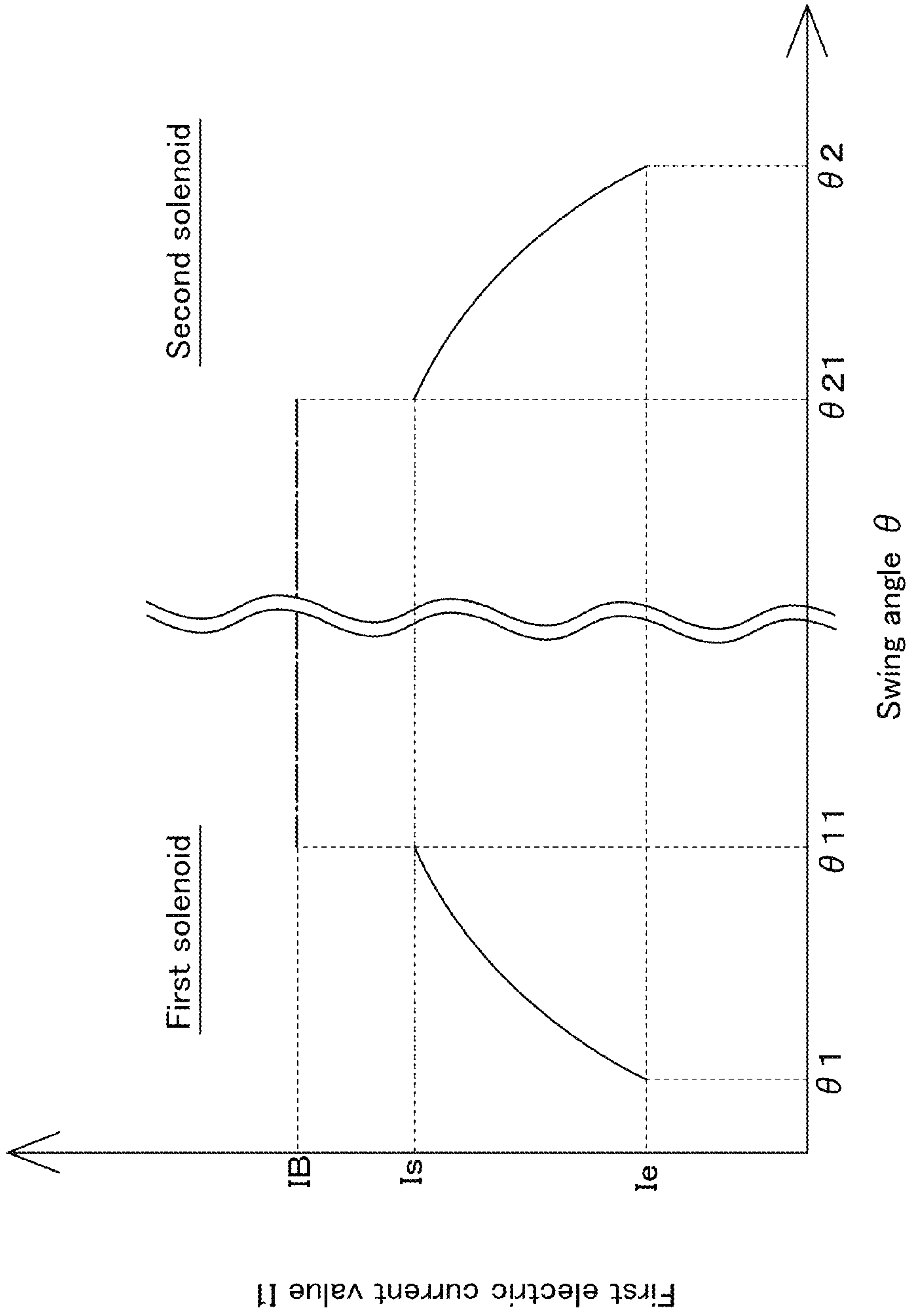
FIG. 8 illustrates an example of a relationship between the angle of the movable member and a first electric current value in the first embodiment.

FIG. 8 illustrates an example of a relationship between the swing angle θ of the movable member 21 and the first electric current value I1 in the first embodiment. In a case where the determination distance H is the first threshold value T1, that is, in a case where the swing angle θ of the movable member 21 is the first determination angle θ11 or the second determination angle θ21, the first electric current value I1 corresponds to the reference angular velocity ωB. As described above, in a case where the electric current of the reference electric current value IB is supplied to the electromagnetic proportional valve 70, the maximum angular velocity ωmax (the reference angular velocity ωB) is minimum in a case where which the swing angle θ of the movable member 21 is the middle angle θ3, and therefore the first electric current value I1 (start electric current value Is) in a case where the swing angle θ of the movable member 21 is the first determination angle θ11 or the second determination angle θ21 is less than the reference electric current value IB (Is<IB).

As illustrated in FIG. 8, as the determination distance H decreases from the first threshold value T1 to zero, the first electric current value I1 decreases to a magnitude (a first terminal electric current value Ie) corresponding to the terminal angular velocity ωE. That is, the first electric current value I1 in a case where the determination distance H is zero is an electric current value corresponding to the predetermined terminal angular velocity ωE smaller than the reference angular velocity ωB, and the first electric current value I1 is defined within a range equal to or greater than the first terminal electric current value Ie and equal to or less than the start electric current value Is (Ie≤I1≤Is). Specifically, as illustrated in FIG. 8, when the swing angle θ of the movable member 21 decreases from the first determination angle θ11, the first electric current value I1 decreases in a curve so as to gradually decrease and then rapidly decrease as the swing angle θ of the movable member 21 decreases, and reaches the first terminal electric current value Ie when the swing angle θ reaches the minimum angle θ1. In the present embodiment, in a case where an electric current is supplied to the first solenoid 70*a* and no electric current is supplied to the second solenoid 70*b*, the switching position of the spool is switched to the first position 70A, and the hydraulic cylinder 22 contracts. Accordingly, in a case where the swing angle θ of the movable member 21 is equal to or less than the first determination angle θ11, the first electric current value I1 is an electric current value I supplied to the first solenoid 70*a*.

As illustrated in FIG. 8, when the swing angle θ of the movable member 21 increases from the second determination angle θ21, the first electric current value I1 decreases in a curve so as to gradually decrease and then rapidly decrease as the swing angle θ of the movable member 21 increases, and reaches the first terminal electric current value Ie when the swing angle θ reaches the maximum angle θ2. In the present embodiment, in a case where no electric current is supplied to the first solenoid 70*a* and an electric current is supplied to the second solenoid 70*b*, the switching position of the spool is switched to the second position 70B, and the hydraulic cylinder 22 extends. Accordingly, in a case where the swing angle θ of the movable member 21 is equal to or greater than the second determination angle θ21, the first electric current value I1 is an electric current value I supplied to the second solenoid 70*b*.

Note that the first threshold value T1 and the terminal angular velocity ωE are values stored in advance in the storage unit 81, and may be changeable by operating an operation unit (not illustrated) of the working machine 1 or a terminal (a display, a PC, a smartphone, or the like) communicably connected to the controller 80.

The second calculator 87 calculates a second electric current value I2, which is an electric current value I of an electric current supplied to the electromagnetic proportional valve 70 in order to control the electromagnetic proportional valve 70 to decrease the flow rate of the hydraulic fluid supplied to the hydraulic cylinder 22 as the operation length L of the hydraulic cylinder 22 approaches the stroke end E of the hydraulic cylinder 22. The second electric current value I2 is an electric current value that restricts an operation speed of the hydraulic cylinder 22 by decreasing the flow rate of the hydraulic fluid supplied to the hydraulic cylinder 22 from the predetermined flow rate as the determination distance H approaches zero.

Specifically, the second calculator 87 calculates the second electric current value I2 in a case where the determination distance H is equal to or less than a second threshold value T2 and does not calculate the second electric current value I2 in a case where the determination distance H is longer than the second threshold value T2. The second threshold value T2 is defined as a value longer than the first threshold value T1.

The operation length L in a case where the determination distance H is the second threshold value T2 is a third determination length L12 on the first stroke end E1 side and a fourth determination length L22 on the second stroke end E2 side, as illustrated in FIG. 5.

As illustrated in FIG. 5, the swing angle θ of the movable member 21 corresponding to the third determination length L12 is a third determination angle θ12, and the swing angle θ of the movable member 21 corresponding to the fourth determination length L22 is a fourth determination angle θ22. That is, the second calculator 87 calculates the second electric current value I2 in a case where the swing angle θ of the movable member 21 is equal to or less than the third determination angle θ12 and equal to or greater than the fourth determination angle θ22.

Figure 9:
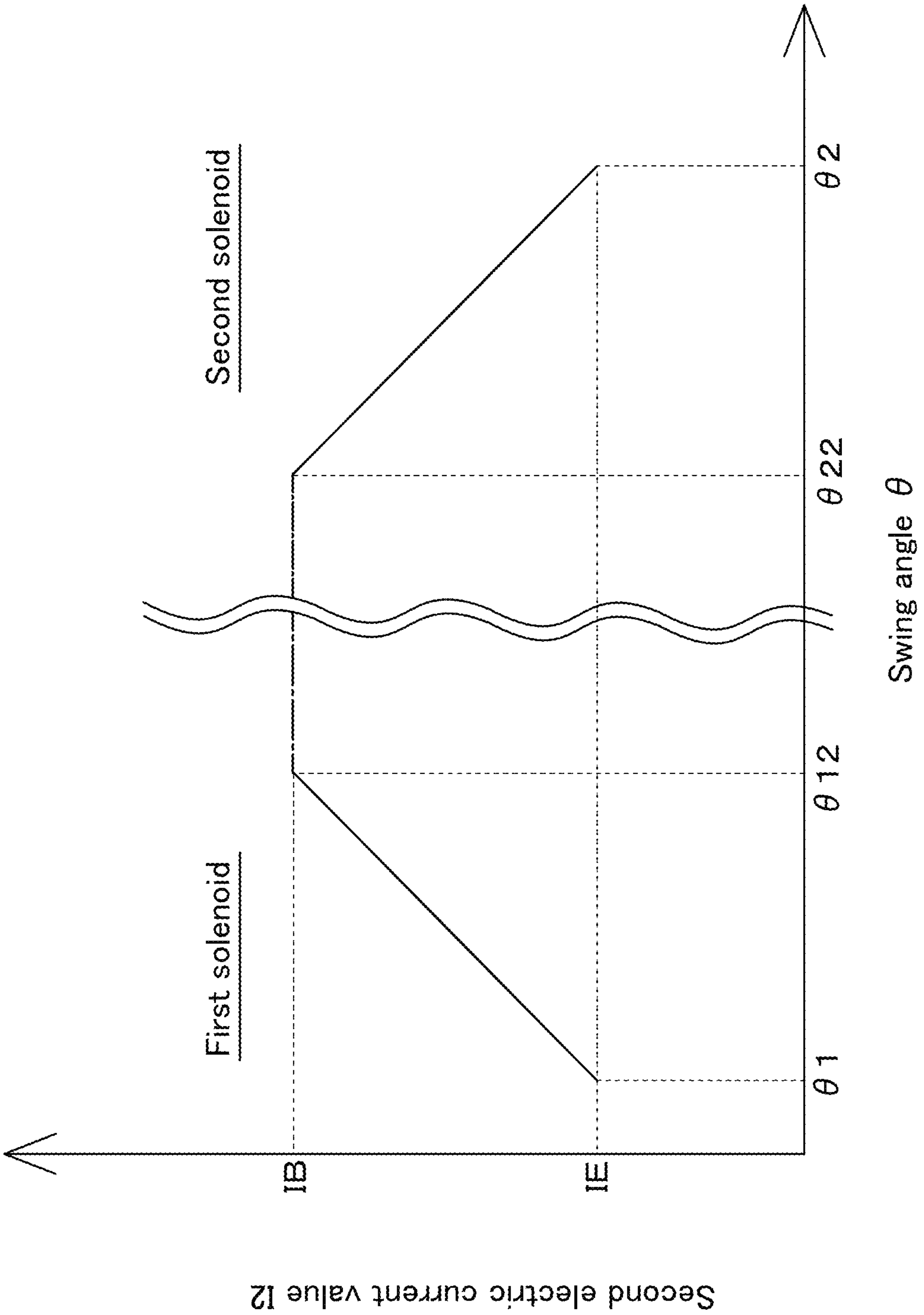
FIG. 9 illustrates an example of a relationship between the angle of the movable member and a second electric current value in the first embodiment.

The second electric current value I2 is equal to or less than the reference electric current value IB and decreases as the determination distance H approaches zero. The second calculator 87 calculates the second electric current value I2 corresponding to the swing angle θ of the movable member 21 on the basis of an arithmetic formula or an arithmetic map stored in the storage unit 81. FIG. 9 illustrates an example of a relationship between the swing angle θ of the movable member 21 and the second electric current value I2 in the first embodiment. As illustrated in FIG. 9, the second electric current value I2 is defined within a range equal to or greater than a second terminal electric current value IE and equal to or less than the reference electric current value IB (IE≤I2≤IB).

Note that the relationship between the swing angle θ of the movable member 21 and the second electric current value I2 illustrated in FIG. 9 is merely an example, and the relationship is not limited to the example of FIG. 9, as long as the second electric current value I2 decreases as the swing angle θ of the movable member 21 decreases from the third determination angle θ12 to the minimum angle θ1 and decreases as the swing angle θ of the movable member 21 increases from the fourth determination angle θ22 to the maximum angle θ2. For example, the second electric current value I2 may increase or decrease in a curve as the swing angle θ of the movable member 21 increases or decreases. The relationship between the swing angle θ of the movable member 21 and the second electric current value I2 may be defined to vary depending on a target (the working device 20) of the cushion control of the controller 80.

In a case where the determination distance H is the second threshold value T2, that is, in a case where the swing angle θ of the movable member 21 is the third determination angle θ12 or the fourth determination angle θ22, the second electric current value I2 is the same as the reference electric current value IB. The second electric current value I2 in a case where the determination distance H is zero is the second terminal electric current value IE. Note that the second electric current value I2 in a case where the determination distance H is the second threshold value T2 can be any electric current value I for supplying the hydraulic fluid to the hydraulic cylinder 22 at a flow rate substantially equal to the predetermined flow rate and need not necessarily match the reference electric current value IB. That is, the second electric current value I2 in a case where the determination distance H is the second threshold value T2 may be defined as an electric current value I higher than the reference electric current value IB in order to supply the hydraulic fluid to the hydraulic cylinder 22 at the predetermined flow rate with certainty.

As illustrated in FIG. 9, as the determination distance H decreases from the second threshold value T2 to zero, the second electric current value I2 decreases substantially proportionately from the reference electric current value IB to the second terminal electric current value IE. The second terminal electric current value IE is defined as an electric current value I larger than the first terminal electric current value Ie (Ie<IE). Note that the second electric current value I2 in a case where the determination distance H is zero can be any value equal to less than the reference electric current value IB, and a magnitude thereof is not limited in particular.

In the present embodiment, in a case where an electric current is supplied to the first solenoid 70*a* and no electric current is supplied to the second solenoid 70*b*, the switching position of the spool is switched to the first position 70A, and the hydraulic cylinder 22 contracts. Accordingly, in a case where the swing angle θ of the movable member 21 is equal to or less than the third determination angle θ12, the second electric current value 12 is an electric current value I supplied to the first solenoid 70*a*.

In the present embodiment, in a case where no electric current is supplied to the first solenoid 70*a* and an electric current is supplied to the second solenoid 70*b*, the switching position of the spool is switched to the second position 70B, and the hydraulic cylinder 22 extends. Accordingly, in a case where the swing angle θ of the movable member 21 is equal to or greater than the fourth determination angle θ22, the second electric current value I2 is an electric current value I supplied to the second solenoid 70*b*.

Note that the second threshold value T2 is a value stored in advance in the storage unit 81 and may be changeable by operating an operation actuator of the working machine 1 or operating a terminal (a display, a PC, a smartphone, or the like) communicably connected to the controller 80.

Figure 10:
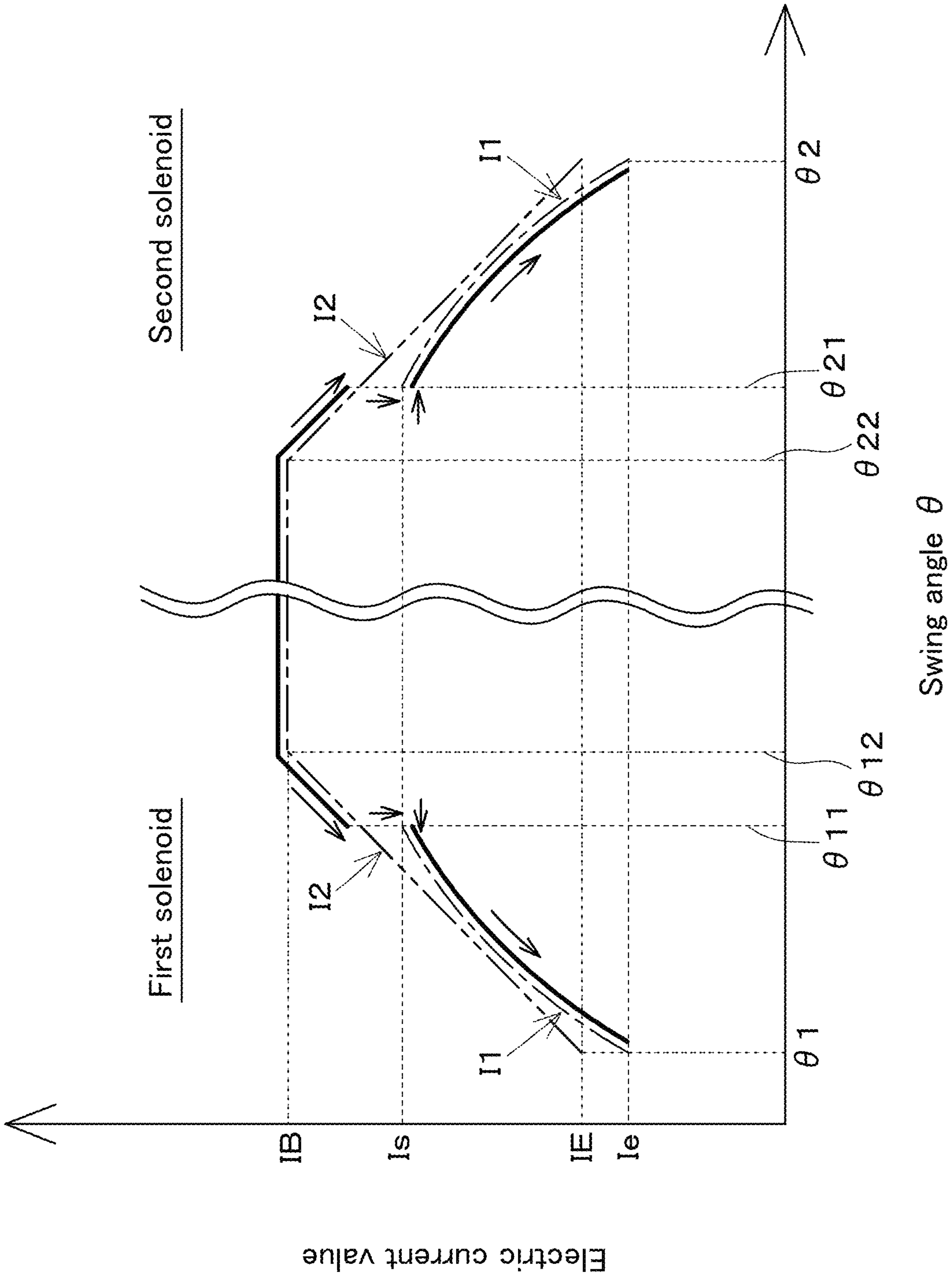
FIG. 10 illustrates comparison between the first electric current value and the second electric current value in the first embodiment.

FIG. 10 illustrates comparison between the first electric current value I1 and the second electric current value I2 in the first embodiment. In FIG. 10, the first electric current value I1 is indicated by the line with alternate long and short dashes, and the second electric current value I2 is indicated by the line with alternate long and two short dashes. Furthermore, the electric current value I of the supply electric current is indicated by the solid line, and is shifted from the first electric current value I1 and the second electric current value I2 for convenience of illustration.

The electric current restrictor 88 corrects the electric current supplied to the electromagnetic proportional valve 70 by using the second electric current value I2 in a case where the determination distance H is longer than the first threshold value T1 and is equal to or less than the second threshold value T2, and corrects the electric current supplied to the electromagnetic proportional valve 70 by using a selected one of the first electric current value I1 and the second electric current value I2 in a case where the determination distance H is equal to or less than the first threshold value T1. In the present embodiment, the electric current restrictor 88 restricts the supply electric current by correcting the supply electric current defined by the definer 82 by the first electric current value I1 or the second electric current value I2. In the present embodiment, the cushion control is performed on the boom device 30, the arm device 40, the working tool device 50, and the dozer device 60, and therefore the electric current restrictor 88 corrects the supply electric currents defined by the boom controller 82_a_, the arm controller 82_b_, the bucket controller 82_c_, and the dozer controller 82_d_.

As illustrated in FIG. 10, the electric current restrictor 88 selects the second electric current value 12 in a case where the determination distance H is longer than the first threshold value T1 and is equal to or less than the second threshold value T2, that is, in a case where the swing angle θ of the movable member 21 is equal to or less than the third determination angle θ12 and greater than the first determination angle θ11 and in a case where the swing angle θ of the movable member 21 is equal to or greater than the fourth determination angle θ22 and less than the second determination angle θ21. In a case where the supply electric current defined by the definer 82 is greater than the selected second electric current value 12 (selected electric current value Ic), the electric current restrictor 88 corrects the supply electric current by using the second electric current value I2.

On the other hand, as illustrated in FIG. 10, in a case where the determination distance H is equal to or less than the first threshold value T1, that is, in a case where the swing angle θ of the movable member 21 is equal to or less than the first determination angle θ11 and in a case where the swing angle θ of the movable member 21 is equal to or greater than the second determination angle θ21, the electric current restrictor 88 selects an electric current value I that is smaller in flow rate of the hydraulic fluid supplied to the hydraulic cylinder 22 from among the first electric current value I1 calculated by the first calculator 86 and the second electric current value I2 calculated by the second calculator 87. In a case where the supply electric current defined by the definer 82 is greater than the selected electric current value I (selected electric current value Ic), the electric current restrictor 88 corrects the supply electric current by using the selected electric current value Ic.

Accordingly, for example, in a state where the first operation device 90 is operated and the definer 82 defines the reference electric current value IB as the supply electric current, when the hydraulic cylinder 22 approaches the stroke end E and the determination distance H reaches the second threshold value T2, the supply electric current is first corrected by the second electric current value I2 and gradually decreases from the reference electric current value IB. When the hydraulic cylinder 22 further approaches the stroke end E and the determination distance H reaches the first threshold value T1, the supply electric current is corrected by the selected electric current value Ic, which is a smaller one of the first electric current value I1 and the second electric current value I2.

Although a rapid fluctuation in electric current value from the reference electric current value IB to the start electric current value is sometimes occurs in a case where the supply electric current is corrected only by the first electric current value I1, the electric current value I can be decreased while preventing or reducing the rapid fluctuation in electric current value by correcting the supply electric current by the second electric current value I2 in advance. This makes it possible to decelerate the swing speed of the movable member 21 more smoothly when the hydraulic cylinder 22 approaches the stroke end E.

Note that although the electric current restrictor 88 selects any one of the first electric current value I1 and the second electric current value I2 in a section where the determination distance H decreases from the second threshold value T2 to zero in the present embodiment, a selection method is not limited to the above method. For example, the electric current restrictor 88 may select the second electric current value I2 in a case where the determination distance H is longer than the first threshold value T1 and is equal to or less than the second threshold value T2 and select the first electric current value I1 in a case where the determination distance H is equal to or less than the first threshold value T1.

Figure 11:
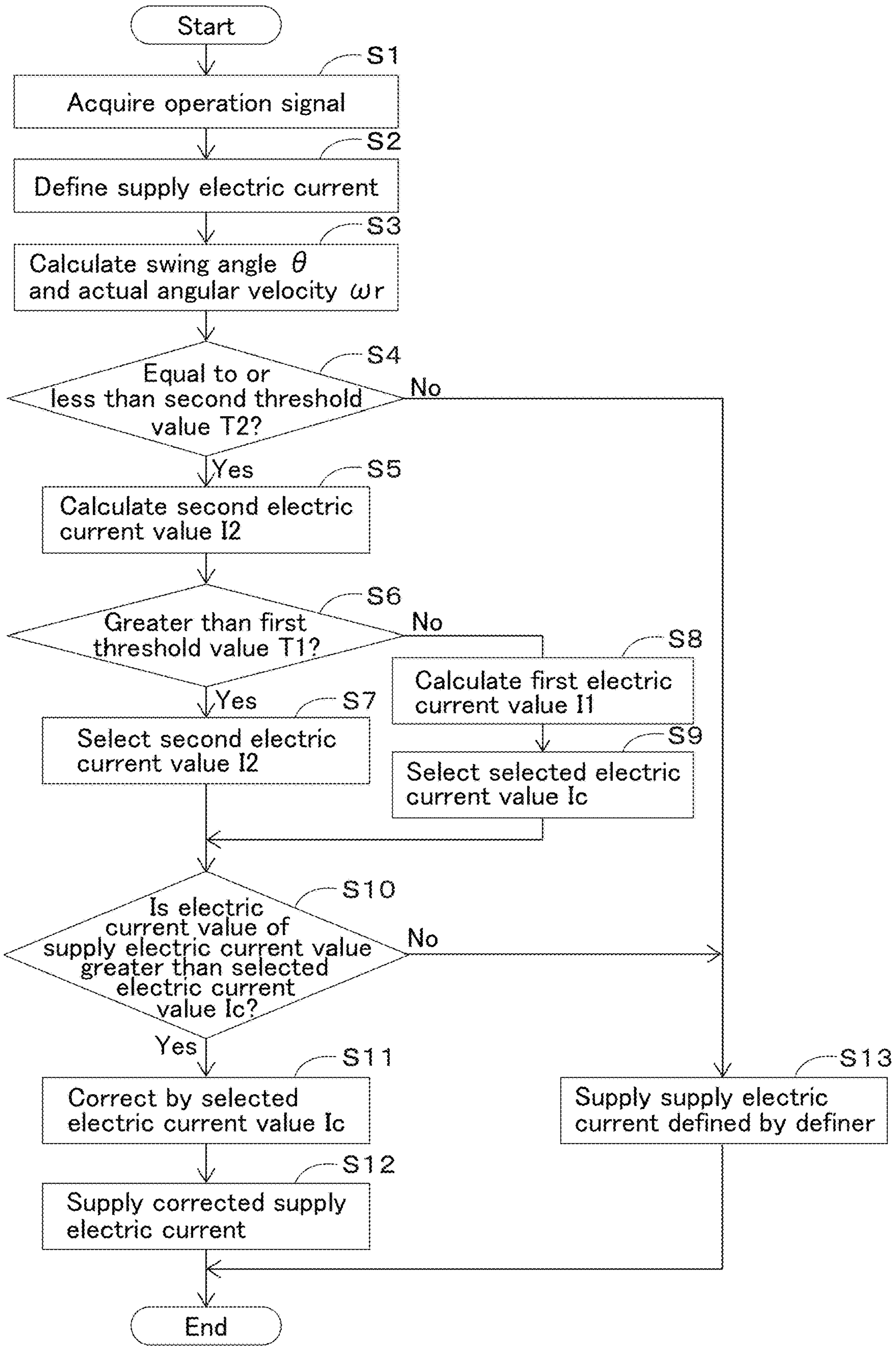
FIG. 11 is a flowchart for explaining a flow of cushion control in the first embodiment.

Restriction of the supply electric current in the cushion control is described below with reference to FIG. 11. FIG. 11 is a flowchart for explaining a flow of the cushion control in the first embodiment. First, the definer 82 acquires an electric signal (operation signal) indicative of a swing direction and a swing amount from the first operation device 90 (S1) and defines a supply electric current of an operation target on the basis of the acquired operation signal (S2).

Next, the angle calculator 85 calculates the swing angle θ and the actual angular velocity or of the movable member 21 (S3).

Next, the electric current restrictor 88 determines whether or not the determination distance H is equal to or less than the second threshold value T2 (S4).

In a case where the electric current restrictor 88 determines that the determination distance H is equal to or less than the second threshold value T2 (S4, Yes), the second calculator 87 calculates the second electric current value I2 (S5, a second step).

Next, the electric current restrictor 88 determines whether or not the determination distance H is greater than the first threshold value T1 (S6).

In a case where the electric current restrictor 88 determines that the determination distance H is greater than the first threshold value T1 (S6, Yes), the electric current restrictor 88 selects the second electric current value I2 calculated by the second calculator 87 as the selected electric current value Ic (S7).

In a case where the electric current restrictor 88 determines that the determination distance H is not greater than the first threshold value T1 (S6, No), the first calculator 86 calculates the restriction angular velocity ωL and calculates the first electric current value I1 corresponding to the restriction angular velocity ωL (S8, a first step).

Next, the electric current restrictor 88 selects as the selected electric current value Ic, an electric current value I that is smaller in flow rate of the hydraulic fluid supplied to the hydraulic cylinder 22 from among the first electric current value I1 calculated by the first calculator 86 and the second electric current value I2 calculated by the second calculator 87 (S9). In the present embodiment, the electric current restrictor 88 selects a smaller one of the first electric current value I1 and the second electric current value 12 as the selected electric current value Ic.

When the electric current restrictor 88 selects the selected electric current value Ic (S7 or S9), the electric current restrictor 88 determines whether or not the supply electric current defined by the definer 82 is greater than the selected electric current value Ic (S10).

In a case where the electric current restrictor 88 determines that the electric current value I of the supply electric current is greater than the selected electric current value Ic (S10, Yes), the electric current restrictor 88 corrects the electric current value I of the supply electric current by the selected electric current value Ic (S11). Next, the controller 80 supplies the corrected supply electric current to the electromagnetic proportional valve 70 (S12). Note that S7 and S9 to S12 are referred to as a third step.

On the other hand, in a case where the electric current restrictor 88 determines that the determination distance H is greater than the second threshold value T2 (S4, No) and in a case where the electric current restrictor 88 determines that the electric current value I of the supply electric current is not greater than the selected electric current value Ic (S10, No), the controller 80 supplies the supply electric current defined by the definer 82 to the electromagnetic proportional valve 70 without correcting the supply electric current by the selected electric current value Ic (S13).

The hydraulic system S of the working machine 1 includes a working device 20 that includes a movable member 21 and a hydraulic cylinder 22 that swings the movable member 21; an electromagnetic proportional valve 70 to change a flow rate of a hydraulic fluid supplied to the hydraulic cylinder 22; and a controller 80 to control the flow rate of the hydraulic fluid supplied to the hydraulic cylinder 22 to a predetermined flow rate or less by controlling an electric current supplied to the electromagnetic proportional valve 70, in which the controller 80 includes: a first calculator 86 to calculate a first electric current value I1, which is an electric current value I of an electric current supplied to the electromagnetic proportional valve 70 in order to control the electromagnetic proportional valve 70 to decelerate an angular velocity ω of the movable member 21 as an operation length L of the hydraulic cylinder 22 approaches a stroke end E of the hydraulic cylinder 22, a second calculator 87 to calculate a second electric current value I2, which is an electric current value I of an electric current supplied to the electromagnetic proportional valve 70 in order to control the electromagnetic proportional valve 70 to decrease a supply flow rate of the hydraulic fluid to the hydraulic cylinder 22 as the operation length L of the hydraulic cylinder 22 approaches the stroke end E of the hydraulic cylinder 22, and an electric current restrictor 88 to correct the electric current supplied to the electromagnetic proportional valve 70 by the second electric current value I2 in a case where a determination distance H, which is an operation length L from a current operation position of the hydraulic cylinder 22 to the stroke end E, is longer than a first threshold value T1 and is equal to or less than a second threshold value T2 longer than the first threshold value T1 and to correct the electric current supplied to the electromagnetic proportional valve 70 by a selected one of the first electric current value I1 and the second electric current value I2 in a case where the determination distance H is equal to or less than the first threshold value T1.

According to the configuration, when the hydraulic cylinder 22 approaches the stroke end E, the flow rate of the hydraulic fluid supplied to the hydraulic cylinder 22 can be gradually decreased, and swing of the movable member 21 can be smoothly decelerated.

The first calculator 86 does not calculate the first electric current value I1 in a case where the determination distance H is longer than the first threshold value T1; and the second calculator 87 does not calculate the second electric current value I2 in a case where the determination distance H is longer than the second threshold value T2.

According to the configuration, the electric current restrictor 88 restricts the electric current in order from the second electric current value I2 as the hydraulic cylinder 22 approaches the stroke end E, and thereby can gradually decrease the flow rate of the hydraulic fluid supplied to the hydraulic cylinder 22 from the predetermined flow rate and more smoothly decelerate swing of the movable member 21.

The first electric current value I1 in a case where the determination distance H is the first threshold value T1 is an electric current value I corresponding to a reference angular velocity ωB, which is a minimum value of the angular velocity ω in a case where the flow rate of the hydraulic fluid supplied to the hydraulic cylinder 22 is the predetermined flow rate; and the first electric current value I1 in a case where the determination distance H is zero is an electric current value I corresponding to a predetermined terminal angular velocity ωE smaller than the reference angular velocity ωB.

According to the configuration, the deceleration can be performed when the determination distance H becomes the first threshold value T1, that is, as soon as the hydraulic cylinder 22 approaches the stroke end E. Therefore, when the electric current controller restricts the electric current supplied to the electromagnetic proportional valve 70, it is possible to decelerate the hydraulic cylinder 22 with more certainty.

The second electric current value I2 in a case where the determination distance H is the second threshold value T2 is an electric current value I for supplying the hydraulic fluid at a flow rate substantially equal to the predetermined flow rate to the hydraulic cylinder 22.

According to the configuration, when the hydraulic cylinder 22 approaches the stroke end E and the determination distance H becomes the second threshold value T2, the flow rate of the hydraulic fluid supplied to the hydraulic cylinder 22 can be gradually decreased from the predetermined flow rate, and swing of the movable member 21 can be more smoothly decelerated.

The electric current restrictor 88 selects one of the first electric current value I1 and the second electric current value I2 that is smaller in the flow rate of the hydraulic fluid supplied to the hydraulic cylinder 22 in a case where the determination distance H is equal to or less than the first threshold value T1.

According to the configuration, when the hydraulic cylinder 22 approaches the stroke end E, the flow rate of the hydraulic fluid supplied to the hydraulic cylinder 22 can be decreased with certainty, and swing of the movable member 21 can be more smoothly decelerated.

The electric current restrictor 88 corrects the electric current supplied to the electromagnetic proportional valve 70 by the first electric current value I1 in a case where the determination distance H is equal to or less than the first threshold value T1.

According to the configuration, the electric current value by which the electric current supplied to the electromagnetic proportional valve 70 is corrected is switched from the second electric current value I2 to the first electric current value I1 as the hydraulic cylinder 22 approaches the stroke end E, and thereby the movable member 21 can be smoothly decelerated in accordance with the angular velocity ω in the vicinity of the stroke end E.

The hydraulic system S of the working machine 1 further includes a first operation device 90 that outputs an operation signal to the controller 80, in which the controller 80 includes a definer 82 to define, on the basis of the operation signal, the electric current supplied to the electromagnetic proportional valve 70 within a range equal to or less than a reference electric current value IB at which an opening of the electromagnetic proportional valve 70 is maximum and the flow rate of the hydraulic fluid supplied to the hydraulic cylinder 22 is the predetermined flow rate, and the electric current restrictor 88 corrects the electric current value I defined by the definer 82 by the first electric current value I1 or the second electric current value I2.

According to the configuration, in a case where the hydraulic cylinder 22 is controlled by an operation signal, when the hydraulic cylinder 22 approaches the stroke end E, the flow rate of the hydraulic fluid supplied to the hydraulic cylinder 22 can be gradually decreased by supplying the first electric current value I1 or the second electric current value I2 to the electromagnetic proportional valve 70. This makes it possible to smoothly decelerate swing of the movable member 21.

A method for controlling a hydraulic system S of a working machine 1 including a working device 20 that includes a movable member 21 and a hydraulic cylinder 22 that swings the movable member 21 and an electromagnetic proportional valve 70 to change a flow rate of a hydraulic fluid supplied to the hydraulic cylinder 22, in which the flow rate of the hydraulic fluid supplied to the hydraulic cylinder 22 is controlled to a predetermined flow rate or less by controlling an electric current supplied to the electromagnetic proportional valve 70, includes a first step of calculating a first electric current value I1, which is an electric current value I of an electric current supplied to the electromagnetic proportional valve 70 in order to control the electromagnetic proportional valve 70 to decelerate an angular velocity ω of the movable member 21 as an operation length L of the hydraulic cylinder 22 approaches a stroke end E of the hydraulic cylinder 22, a second step of calculating a second electric current value I2, which is an electric current value I of an electric current supplied to the electromagnetic proportional valve 70 in order to control the electromagnetic proportional valve 70 to decrease a supply flow rate of the hydraulic fluid 22 to the hydraulic cylinder 22 as the operation length L of the hydraulic cylinder 22 approaches the stroke end E of the hydraulic cylinder 22; and a third step of correcting the electric current supplied to the electromagnetic proportional valve 70 by the second electric current value I2 in a case where a determination distance H, which is an operation length L from a current operation position of the hydraulic cylinder 22 to the stroke end E, is longer than a first threshold value T1 and is equal to or less than a second threshold value T2 longer than the first threshold value T1 and correcting the electric current supplied to the electromagnetic proportional valve 70 by one of the first electric current value I1 and the second electric current value I2 that is smaller in the flow rate of the hydraulic fluid supplied to the hydraulic cylinder 22 in a case where the determination distance H is equal to or less than the first threshold value T1.

According to the configuration, when the hydraulic cylinder 22 approaches the stroke end E, the flow rate of the hydraulic fluid supplied to the hydraulic cylinder 22 can be gradually decreased, and swing of the movable member 21 can be smoothly decelerated.

Second Embodiment

Figure 12:
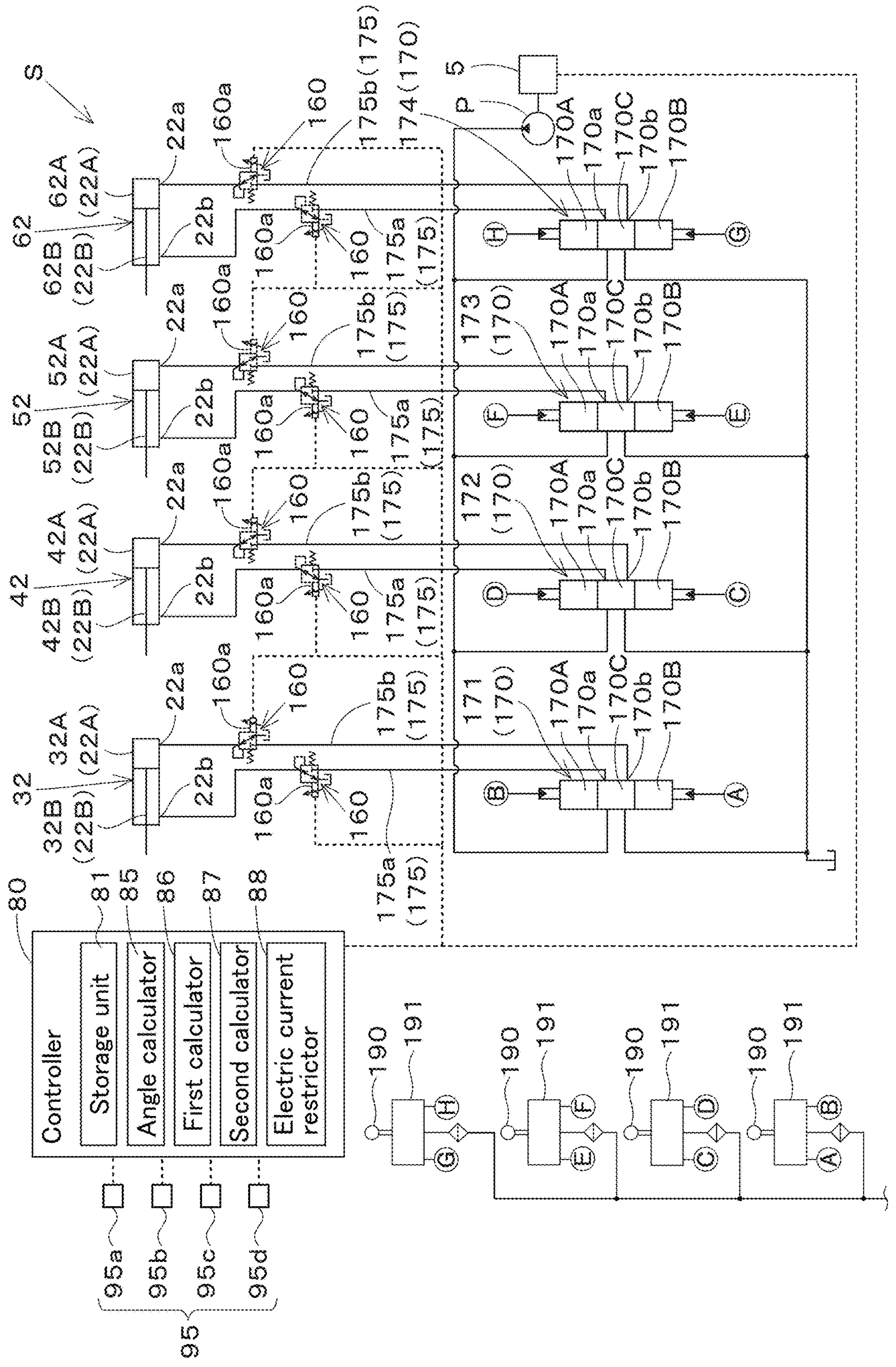
FIG. 12 illustrates a hydraulic system of a working machine in the second embodiment.

FIG. 12 illustrates another embodiment (second embodiment) of a hydraulic system S of a working machine 1. In the following description, constituent elements of the hydraulic system S of the working machine 1 according to the second embodiment that are different from the above embodiment (the first embodiment) are mainly described, and constituent elements identical to those in the first embodiment are given identical reference signs and detailed description thereof is omitted. Although a case where the electromagnetic proportional valve 70 includes the boom control valve 71, the arm control valve 72, the bucket control valve 73, and the dozer control valve 74, in other words, a case where the boom control valve 71, the arm control valve 72, the bucket control valve 73, and the dozer control valve 74 are the electromagnetic proportional valve 70 has been described as an example has been described in the first embodiment, a boom control valve 171, an arm control valve 172, a bucket control valve 173, and a dozer control valve 174 are a direction switching valve 170 that controls the hydraulic cylinder 22 by changing a switching position and changing a flow rate of a hydraulic fluid supplied to a hydraulic cylinder 22, and an electromagnetic proportional valve 160 is separate from the direction switching valve 170 in the second embodiment.

As illustrated in FIG. 12, the hydraulic system S of the working machine 1 includes a second operation device 190, a pilot valve 191, the direction switching valve 170, and a connecting oil passage 175. The second operation device 190 is an operation actuator that is operable. The second operation device 190 is, for example, an operation lever, a pedal, or the like disposed around an operator's seat 6.

The pilot valve 191 controls a flow rate of an ejected pilot oil in accordance with operation of the second operation device 190. The pilot valve 191 is a valve that can change a pressure (pilot pressure) of a pilot oil output in accordance with an operation direction and an operation amount of the second operation device 190 and outputs the pilot pressure to the direction switching valve 170.

The direction switching valve 170 is a direct acting spool type switching valve, and can change a switching position by a hydraulic fluid supplied from the pilot valve 191. The spool is moved in proportion to a flow rate of the hydraulic fluid supplied from the pilot valve 191, and thereby the direction switching valve 170 supplies a hydraulic fluid of an amount proportionate to an amount by which the spool has been moved to the hydraulic cylinder 22 of an operation target. The spool is switchable among a first position 170A, a second position 170B, and a third position (neutral position) 170C, which are switching positions. Note that the direction switching valve 170 is not limited to a three-position switching valve and may be a two-position switching valve, a four-position switching valve, or the like. Operations of the working device 20 depending on the switching positions of the direction switching valve 170 (the boom control valve 171, the arm control valve 172, the bucket control valve 173, and the dozer control valve 174) are similar to those in a case where the boom control valve 71, the arm control valve 72, the bucket control valve 73, and the dozer control valve 74 are the electromagnetic proportional valve 160 in the first embodiment, and therefore detailed description thereof is omitted.

The connecting oil passage 175 is an oil passage that connects the direction switching valve 170 and the hydraulic cylinder 22. One end of the connecting oil passage 175 is connected to supply/discharge ports 170*a* and 170*b* of the direction switching valve 170, and the other end portion of the connecting oil passage 175 is connected to the hydraulic cylinder 22. Specifically, the connecting oil passage 175 includes a first connecting oil passage 175*a* that connects the first supply/discharge port 170*a* of the direction switching valve 170 and a first port (a port on a piston rod 22B side) 22*b* of the hydraulic cylinder 22 and a second connecting oil passage 175*b* that connects the second supply/discharge port 170*b* of the direction switching valve 170 and a second port (a port on a cylinder portion 22A) 22*a* of the hydraulic cylinder 22.

That is, by actuating the direction switching valve 170, a hydraulic fluid can be caused to flow from the direction switching valve 170 toward the first connecting oil passage 175*a*, and a hydraulic fluid can be caused to flow from the direction switching valve 170 toward the second connecting oil passage 175*b*. Specifically, when the flow rate of the hydraulic fluid that flows through the first connecting oil passage 175*a* is increased by changing the switching position of the direction switching valve 170, the hydraulic cylinder 22 contracts. When the flow rate of the hydraulic fluid that flows through the second connecting oil passage 175*b* is increased by changing the switching position of the direction switching valve 170, the hydraulic cylinder 22 extends.

As illustrated in FIG. 12, in the second embodiment, the electromagnetic proportional valve 160 is provided in the connecting oil passage 175. In the present embodiment, since a controller 80 performs cushion control at both of a first stroke end E1 and a second stroke end E2, the electromagnetic proportional valve 160 is provided in both of the first connecting oil passage 175*a* and the second connecting oil passage 175*b*. Note that in a case where the cushion control is performed at either the first stroke end E1 or the second stroke end E2, the electromagnetic proportional valve 160 need just be provided in either the first connecting oil passage 175*a* or the second connecting oil passage 175*b*.

The electromagnetic proportional valve 160 is a switching valve that can change the flow rate of the hydraulic fluid supplied to the hydraulic cylinder 22. Specifically, the electromagnetic proportional valve 160 is an opening adjustment valve that changes a supply amount of the hydraulic fluid from the direction switching valve 170 to the hydraulic cylinder 22 at an intermediate point.

As illustrated in FIG. 12, the electromagnetic proportional valve 160 is biased in such a direction as to be switched to a suppression position by a spring, and when a solenoid 160*a* is deenergized, the electromagnetic proportional valve 160 is switched to the suppression position, and when the solenoid 160*a* is energized upon supply of a supply electric current from the controller 80, the electromagnetic proportional valve 160 is switched to a supply position. That is, when the supply electric current increases, the flow rate of the hydraulic fluid supplied from the direction switching valve 170 to the hydraulic cylinder 22 increases, and an angular velocity ω increases.

The supply electric current supplied to the electromagnetic proportional valve 160 by the controller 80 is defined in advance to be a reference electric current value IB. In the present embodiment, the reference electric current value IB is an electric current value I that maximizes an opening of the electromagnetic proportional valve 160.

In the second embodiment, an electric current restrictor 88 selects any one of a first electric current value I1 and a second electric current value 12 as a determination distance H approaches to zero, and restricts the electric current supplied to the electromagnetic proportional valve 160 so that the flow rate of the hydraulic fluid supplied to the hydraulic cylinder 22 decreases from a predetermined flow rate by correcting the electric current value I (the reference electric current value IB) of the supply electric current defined in advance by the selected electric current value I, as in the first embodiment.

In the above embodiment, for example, a detection sensor that detects an operation amount of the second operation device 190 may be provided, and the cushion control may be performed only in a case where the operation amount is equal to or larger than a predetermined value. A pressure sensor that detects a pressure of a hydraulic fluid may be provided in an oil passage that connects the pilot valve 191 and the direction switching valve 170 or in the connecting oil passage 175, and the cushion control may be performed only in a case where the pressure of the hydraulic fluid (pilot oil) is equal to or larger than a predetermined value.

Although a configuration in which the electromagnetic proportional valve 160 is switched to the suppression position when the solenoid 160*a* is deenergized and the electromagnetic proportional valve 160 is switched to the supply position when the solenoid 160*a* is energized upon supply of the supply electric current from the controller 80 has been described as an example in the above embodiment, a configuration in which the electromagnetic proportional valve 160 is switched to the supply position when the solenoid 160*a* is deenergized and the electromagnetic proportional valve 160 is switched to the suppression position when the solenoid 160*a* is energized upon supply of the supply electric current from the controller 80 may be employed as a variation.

In this variation, when the supply electric current increases, the flow rate of the hydraulic fluid supplied from the direction switching valve 170 to the hydraulic cylinder 22 decreases, and the angular velocity ω decreases.

Figure 13:
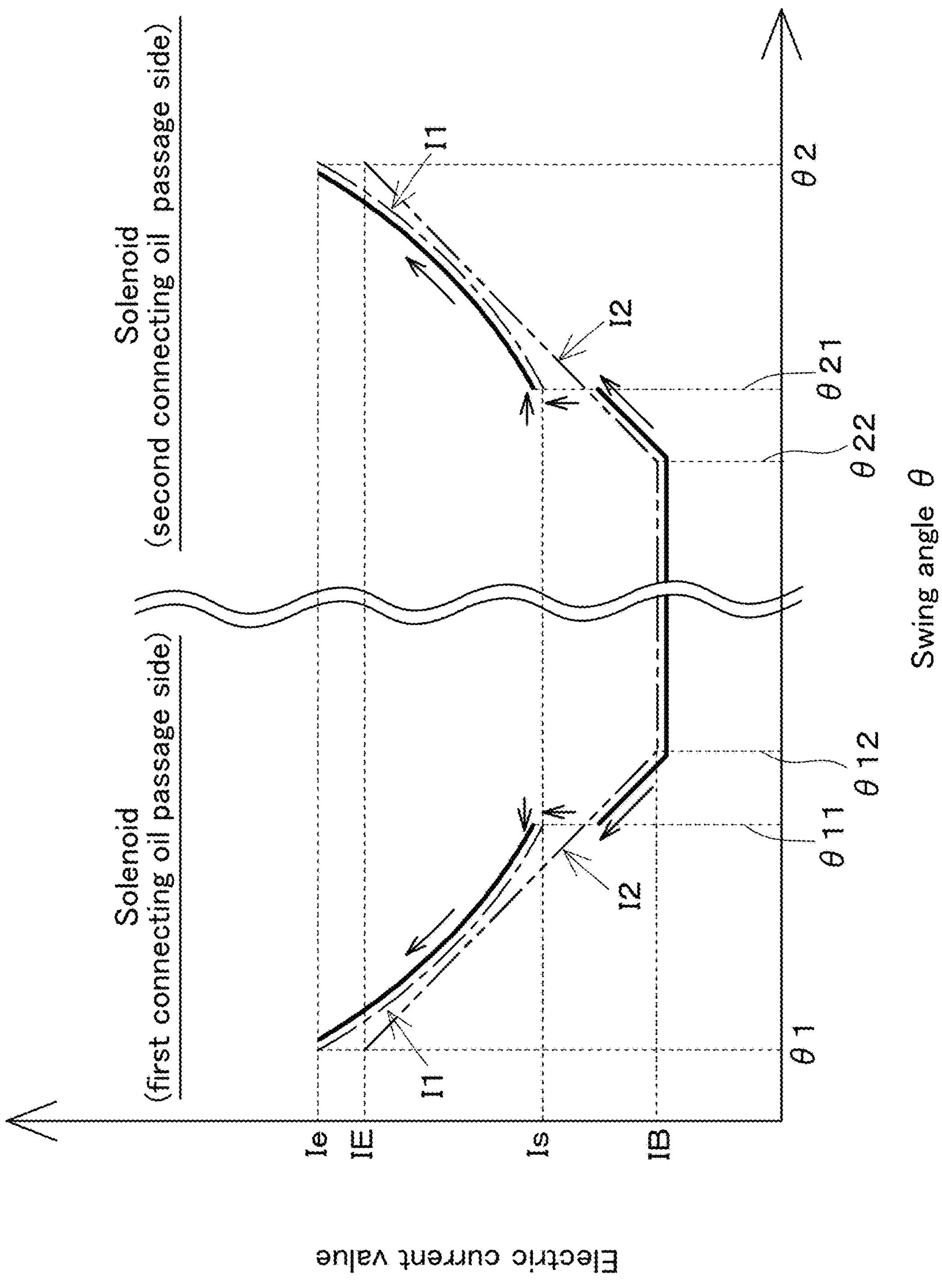
FIG. 13 illustrates comparison between a first electric current value and a second electric current value in a variation of the second embodiment.

Accordingly, in this variation, a swing angle θ of a movable member 21, the first electric current value I1 calculated by a first calculator 86, and the second electric current value I2 calculated by a second calculator 87 are in a relationship illustrated in FIG. 13. In FIG. 13, the first electric current value I1 is indicated by the line with alternate long and short dashes, and the second electric current value I2 is indicated by the line with alternate long and two short dashes. The electric current value I of the supply electric current is indicated by the solid line, and is shifted from the first electric current value I1 and the second electric current value I2 for convenience of illustration.

As illustrated in FIG. 13, as the determination distance H decreases from a first threshold value T1 to zero, the first electric current value I1 increases to a magnitude (first terminal electric current value Ie) corresponding to a terminal angular velocity ωE. That is, in a case where the swing angle θ of the movable member 21 is equal to or less than a first determination angle θ11, the first electric current value I1 increases as the swing angle θ of the movable member 21 decreases, and the first electric current value I1 becomes the first terminal electric current value Ie when the swing angle θ of the movable member 21 reaches a minimum angle θ1. In a case where the swing angle θ of the movable member 21 is equal to or greater than a second determination angle θ21, the first electric current value I1 increases as the swing angle θ of the movable member 21 increases, and the first electric current value I1 becomes the first terminal electric current value Ie when the swing angle θ of the movable member 21 reaches a maximum angle θ2.

As illustrated in FIG. 13, as the determination distance H decreases from a second threshold value T2 to zero, the second electric current value I2 increases substantially proportionately from the reference electric current value IB to a second terminal electric current value IE. That is, in a case where the swing angle θ of the movable member 21 is equal to or less than a third determination angle θ12, the second electric current value I2 increases as the swing angle θ of the movable member 21 decreases, and the second electric current value I2 becomes the second terminal electric current value IE when the swing angle θ of the movable member 21 reaches the minimum angle θ1. In a case where the angle θ of the movable member 21 is equal to or greater than a fourth determination angle θ22, the second electric current value I2 increases as the swing angle θ of the movable member 21 increases, and the second electric current value I2 becomes the second terminal electric current value IE as the swing angle θ of the movable member 21 reaches the maximum angle θ2.

Figure 14:
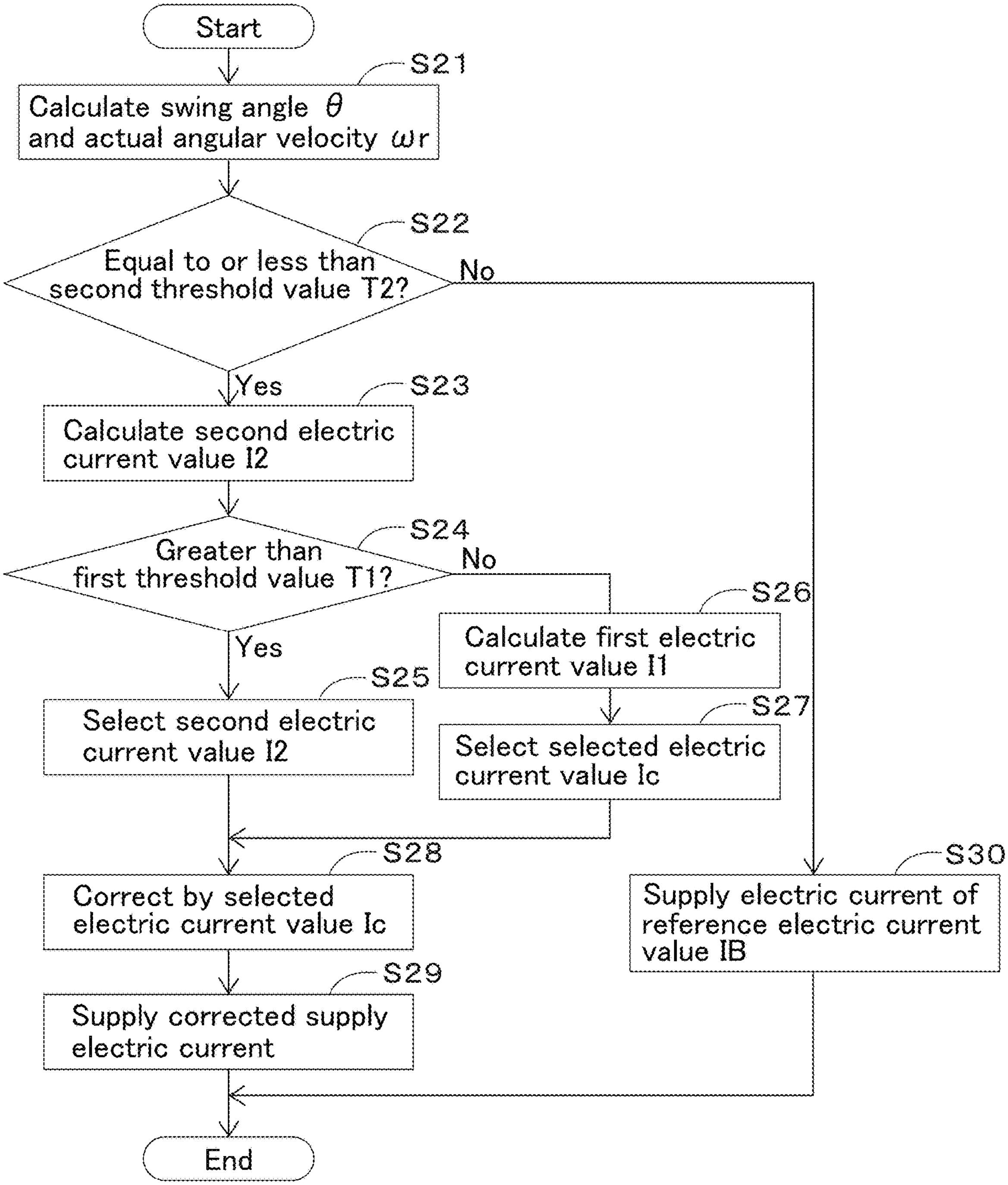
FIG. 14 is a flowchart for explaining a flow of cushion control in the second embodiment.

Restriction of the supply electric current in the cushion control is described below with reference to FIG. 14. FIG. 14 is a flowchart for explaining a flow of the cushion control in the second embodiment. First, an angle calculator 85 calculates the swing angle θ and the actual angular velocity ωr of the movable member 21 on the basis of a detection signal detected by an angle detector 95 (S21).

Next, the electric current restrictor 88 determines whether or not the determination distance H is equal to or less than the second threshold value T2 (S22).

In a case where the electric current restrictor 88 determines that the determination distance H is equal to or less than the second threshold value T2 (S22, Yes), the second calculator 87 calculates the second electric current value I2 (S23, a second step).

Next, the electric current restrictor 88 determines whether or not the determination distance H is greater than the first threshold value T1 (S24).

In a case where the electric current restrictor 88 determines that the determination distance H is greater than the first threshold value T1 (S24, Yes), the electric current restrictor 88 selects the second electric current value I2 calculated by the second calculator 87 as a selected electric current value Ic (S25).

In a case where the electric current restrictor 88 determines that the determination distance H is not greater than the first threshold value T1 (S24, No), the first calculator 86 calculates a restriction angular velocity ωL and the first electric current value I1 corresponding to the restriction angular velocity ωL (S26, a first step).

Next, the electric current restrictor 88 selects, as the selected electric current value Ic, an electric current value I that is smaller in flow rate of the hydraulic fluid supplied to the hydraulic cylinder 22 from among the first electric current value I1 calculated by the first calculator 86 and the second electric current value I2 calculated by the second calculator 87 (S27). In the second embodiment, the electric current restrictor 88 selects a smaller one of the first electric current value I1 calculated by the first calculator 86 and the second electric current value I2 calculated by the second calculator 87. In the variation illustrated in FIG. 13, the electric current restrictor 88 selects a larger one of the first electric current value I1 calculated by the first calculator 86 and the second electric current value I2 calculated by the second calculator 87.

When the electric current restrictor 88 selects the selected electric current value Ic (S25 or S27), the electric current restrictor 88 corrects the electric current value I of the supply electric current by the selected electric current value Ic (S28), and the controller 80 supplies the corrected supply electric current to the electromagnetic proportional valve 160 (S29).

On the other hand, in a case where the electric current restrictor 88 determines that the determination distance H is greater than the second threshold value T2 (S22, No), the controller 80 supplies the electric current of the reference electric current value IB to the electromagnetic proportional valve 70 without correcting the electric current by the selected electric current value Ic (S30). Note that S25 and S27 to S29 are referred to as a third step.

The hydraulic system S of the working machine 1 includes a second operation device 190 that is operable; a pilot valve 191 to control a flow rate of an ejected pilot oil in accordance with operation of the second operation device 190; a direction switching valve 170 to control the hydraulic cylinder 22 by changing a switching position by the pilot oil supplied from the pilot valve 191 and changing the flow rate of the hydraulic fluid supplied to the hydraulic cylinder 22; and a connecting oil passage 175 to connect the direction switching valve 170 and the hydraulic cylinder 22, in which the electromagnetic proportional valve 160 is provided in the connecting oil passage 175, and changes the opening in accordance with the electric current supplied from the controller 80 and changes the flow rate of the hydraulic fluid supplied from the direction switching valve 170 to the hydraulic cylinder 22 to the predetermined flow rate or less.

According to the configuration, in a case where the hydraulic cylinder 22 is controlled by the pilot oil, when the hydraulic cylinder 22 approaches the stroke end E, swing of the movable member 21 can be smoothly decelerated by decreasing the flow rate of the hydraulic fluid flowing through the connecting oil passage 175.

While example embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A hydraulic system of a working machine, comprising:

a working device that includes a movable member and a hydraulic cylinder that swings the movable member;

an electromagnetic proportional valve to change a flow rate of a hydraulic fluid supplied to the hydraulic cylinder; and a controller to control the flow rate of the hydraulic fluid supplied to the hydraulic cylinder to a predetermined flow rate or less by controlling an electric current supplied to the electromagnetic proportional valve, wherein the controller includes:

a first calculator to calculate a first electric current value, which is an electric current value of an electric current supplied to the electromagnetic proportional valve in order to control the electromagnetic proportional valve to decelerate an angular velocity of the movable member as an operation length of the hydraulic cylinder approaches a stroke end of the hydraulic cylinder, a second calculator to calculate a second electric current value, which is an electric current value of an electric current supplied to the electromagnetic proportional valve in order to control the electromagnetic proportional valve to decrease a supply flow rate of the hydraulic fluid to the hydraulic cylinder as the operation length of the hydraulic cylinder approaches the stroke end of the hydraulic cylinder, and an electric current restrictor to correct the electric current supplied to the electromagnetic proportional valve by the second electric current value in a case where a determination distance, which is an operation length from a current operation position of the hydraulic cylinder to the stroke end, is longer than a first threshold value and is equal to or less than a second threshold value longer than the first threshold value and to correct the electric current supplied to the electromagnetic proportional valve by a selected one of the first electric current value and the second electric current value in a case where the determination distance is equal to or less than the first threshold value.

2. The hydraulic system according to claim 1, wherein
the first calculator does not calculate the first electric current value in a case where the determination distance is longer than the first threshold value; and
the second calculator does not calculate the second electric current value in a case where the determination distance is longer than the second threshold value.

3. The hydraulic system according to claim 1, wherein
the first electric current value in a case where the determination distance is the first threshold value is an electric current value corresponding to a reference angular velocity, which is a minimum value of the angular velocity in a case where the flow rate of the hydraulic fluid supplied to the hydraulic cylinder is the predetermined flow rate; and
the first electric current value in a case where the determination distance is zero is an electric current value corresponding to a predetermined terminal angular velocity smaller than the reference angular velocity.

4. The hydraulic system according to claim 1, wherein
the second electric current value in a case where the determination distance is the second threshold value is an electric current value for supplying the hydraulic fluid at a flow rate substantially equal to the predetermined flow rate to the hydraulic cylinder.

5. The hydraulic system according to claim 1, wherein
the electric current restrictor selects one of the first electric current value and the second electric current value that is smaller in the flow rate of the hydraulic fluid supplied to the hydraulic cylinder in a case where the determination distance is equal to or less than the first threshold value.

6. The hydraulic system according to claim 1, wherein
the electric current restrictor corrects the electric current supplied to the electromagnetic proportional valve by the first electric current value in a case where the determination distance is equal to or less than the first threshold value.

7. The hydraulic system according to claim 1, further comprising a first operation device that outputs an operation signal to the controller, wherein
the controller includes a definer to define, on a basis of the operation signal, the electric current supplied to the electromagnetic proportional valve within a range equal to or less than a reference electric current value at which an opening of the electromagnetic proportional valve is maximum and the flow rate of the hydraulic fluid supplied to the hydraulic cylinder is the predetermined flow rate, and
the electric current restrictor corrects the electric current value defined by the definer by the first electric current value or the second electric current value.

8. The hydraulic system according to claim 1, further comprising:
a second operation device that is operable;
an operation valve to control a flow rate of an ejected pilot oil in accordance with operation of the second operation device;
a direction switching valve to control the hydraulic cylinder by changing a switching position by the pilot oil supplied from the operation valve and changing the flow rate of the hydraulic fluid supplied to the hydraulic cylinder; and
a connecting oil passage to connect the direction switching valve and the hydraulic cylinder, wherein
the electromagnetic proportional valve is provided in the connecting oil passage, and changes the opening in accordance with the electric current supplied from the controller and changes the flow rate of the hydraulic fluid supplied from the direction switching valve to the hydraulic cylinder to the predetermined flow rate or less.

9. A method for controlling a hydraulic system of a working machine including a working device that includes a movable member and a hydraulic cylinder that swings the movable member and an electromagnetic proportional valve to change a flow rate of a hydraulic fluid supplied to the hydraulic cylinder, in which the flow rate of the hydraulic fluid supplied to the hydraulic cylinder is controlled to a predetermined flow rate or less by controlling an electric current supplied to the electromagnetic proportional valve, the method comprising:
a first step of calculating a first electric current value, which is an electric current value of an electric current supplied to the electromagnetic proportional valve in order to control the electromagnetic proportional valve to decelerate an angular velocity of the movable member as an operation length of the hydraulic cylinder approaches a stroke end of the hydraulic cylinder,
a second step of calculating a second electric current value, which is an electric current value of an electric current supplied to the electromagnetic proportional valve in order to control the electromagnetic proportional valve to decrease a supply flow rate of the hydraulic fluid to the hydraulic cylinder as the operation length of the hydraulic cylinder approaches the stroke end of the hydraulic cylinder; and
a third step of correcting the electric current supplied to the electromagnetic proportional valve by the second electric current value in a case where a determination distance, which is an operation length from a current operation position of the hydraulic cylinder to the stroke end, is longer than a first threshold value and is equal to or less than a second threshold value longer than the first threshold value and correcting the electric current supplied to the electromagnetic proportional valve by one of the first electric current value and the second electric current value that is smaller in the flow rate of the hydraulic fluid supplied to the hydraulic cylinder in a case where the determination distance is equal to or less than the first threshold value.

* * * * *